US007859142B2

(12) United States Patent
Armeit et al.

(10) Patent No.: US 7,859,142 B2
(45) Date of Patent: Dec. 28, 2010

(54) WOODWORKING MACHINE WITH LINEAR DIRECT DRIVE

(75) Inventors: Hans Ulrich Armeit, Oerlinghausen (DE); Ralph Burgstahler, Erlangen (DE); Zeljko Jajtic, Munich (DE); Markus Knorr, Augsburg (DE); Andreas Rust, Munich (DE); Stefan Schiele, Stetten (DE); Hartmut Schirdewahn, Pyrbaum (DE); Roland Schultheiss, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 126 days.

(21) Appl. No.: 11/816,473

(22) PCT Filed: Feb. 7, 2006

(86) PCT No.: PCT/EP2006/050711

§ 371 (c)(1),
(2), (4) Date: Aug. 16, 2007

(87) PCT Pub. No.: WO2006/087274

PCT Pub. Date: Aug. 24, 2006

(65) Prior Publication Data

US 2008/0265689 A1 Oct. 30, 2008

(30) Foreign Application Priority Data

Feb. 17, 2005 (DE) ....................... 10 2005 007 489

(51) Int. Cl.
*H02K 41/02* (2006.01)

(52) U.S. Cl. ................... 310/12.24; 310/12.01; 310/15; 310/17; 310/22; 310/181

(58) Field of Classification Search ............. 310/12–35, 310/45, 154, 156, 181; *H02K 41/02*
See application file for complete search history.

(56) References Cited

U.S. PATENT DOCUMENTS 4,514,674 A * 4/1985 Hollis et al. ................ 318/687

(Continued)

FOREIGN PATENT DOCUMENTS

DE 195 31 520 A1 1/1997

(Continued)

*Primary Examiner*—Quyen Leung
*Assistant Examiner*—John K Kim
(74) *Attorney, Agent, or Firm*—Henry M. Feiereisen; Ursula B. Day

(57) ABSTRACT

The aim of the invention is to provide a robust, simple woodworking machine. To achieve this, the invention provides a machine comprising at least one linear direct drive, which contains a primary part (3, 3*a*, 3*b*, 4, 4*a*, 4*b*) with a first element (9, 10, 12, 14) for generating a first magnetic field and at least one additional element (17, 18, 20, 27, 28, 29, 30) for generating an additional magnetic field. The first element (9) for generating the first magnetic field is positioned, in particular, in such a way in relation to the additional element (17, 18, 20, 27, 28, 29, 30) for generating the additional magnetic field that the first magnetic field overlaps the additional magnetic field. The machine also comprises a secondary part (5, 6, 6*a*, 6*b*), which comprises magnetic return elements and is devoid of magnetic sources. According to the invention, the primary part (3, 3*a*, 3*b*, 4, 4*a*, 4*b*) and/or the secondary part (5, 6, 6*a*, 6*b*) is or are suitable for guiding or placing at least one workpiece and/or for guiding and/or placing at least one tool for machining the workpiece.

18 Claims, 19 Drawing Sheets

U.S. PATENT DOCUMENTS

| | | | | |
|---|---|---|---|---|
| 4,563,602 | A * | 1/1986 | Nagasaka | 310/12.22 |
| 4,678,971 | A * | 7/1987 | Kanazawa et al. | 318/135 |
| 4,794,286 | A * | 12/1988 | Taenzer | 310/12.19 |
| 4,857,782 | A * | 8/1989 | Tokio et al. | 310/12.19 |
| 5,010,262 | A * | 4/1991 | Nakagawa et al. | 310/12.21 |
| 5,302,873 | A * | 4/1994 | Takei | 310/12.24 |
| 5,602,431 | A * | 2/1997 | Satomi et al. | 310/14 |
| 6,078,114 | A * | 6/2000 | Bessette et al. | 310/12 |
| 6,087,742 | A * | 7/2000 | Maestre | 310/12 |
| 6,522,035 | B1 | 2/2003 | Smit | |
| 6,720,681 | B2 * | 4/2004 | Hsiao | 310/12 |
| 6,844,651 | B1 * | 1/2005 | Swift et al. | 310/214 |
| 6,960,858 | B2 * | 11/2005 | Kawai | 310/181 |
| 7,148,590 | B1 * | 12/2006 | Lampson | 310/12.18 |
| 7,154,198 | B2 * | 12/2006 | Kawai | 310/12.15 |
| 2003/0034696 | A1 * | 2/2003 | Bundschu et al. | 310/12 |
| 2004/0222705 | A1 * | 11/2004 | Uchida | 310/12 |
| 2004/0251751 | A1 * | 12/2004 | Wavre et al. | 310/52 |
| 2004/0256919 | A1 * | 12/2004 | Hashimoto et al. | 310/12 |
| 2005/0082934 | A1 * | 4/2005 | Kawai | 310/181 |
| 2008/0265689 | A1 * | 10/2008 | Armeit et al. | 310/12 |

FOREIGN PATENT DOCUMENTS

| | | | |
|---|---|---|---|
| DE | 198 19 383 | A1 | 11/1998 |
| DE | 102 03 011 | A1 | 8/2003 |
| EP | 0 348 851 | A1 | 1/1990 |
| GB | 1 575 432 | | 9/1980 |
| JP | 59086469 | A | 5/1984 |
| JP | 03093501 | | 9/1989 |
| JP | 4127891 | A | 4/1992 |
| JP | 2000152599 | A | 5/2000 |
| JP | 2001054274 | A | 2/2001 |
| JP | 2003158866 | A | 5/2003 |

* cited by examiner

WOODWORKING MACHINE WITH LINEAR DIRECT DRIVE

BACKGROUND OF THE INVENTION

The invention relates to a woodworking machine having at least one linear direct drive, which has a primary part and a secondary part.

Woodworking machines have numerous linear movements. For example, the workpieces must be transported and machined, and the tools must be set, and auxiliary material must be supplied, with these processes having been carried out until now by means of conventional drive technology and mechanical transmission elements such as gearboxes, rack pinions and ball-roller spindles. These mechanical transmission elements are susceptible to mechanical wear, thus necessitating increased maintenance, if appropriate repair or even replacement.

The achievable accuracies and the desired processor speeds are likewise considerably reduced by the dirt resulting from machining residues such as chips or shavings or dust and corrosive process environments, such as lubricant residues, glue or sealants.

Linear motors that are known per se have been relegated to the background when compared with conventional drive techniques owing to the sensitivity to faults of the external measurement systems that are required for this purpose and the financially poor characteristics of linear drives, for example because of expensive magnets. One major obstruction was, inter alia, the long movement distances of woodworking machines, and the costs associated with them for the linear drive systems required for this purpose.

SUMMARY OF THE INVENTION

Against this background, the invention is based on the object of providing a woodworking machine in which the achievable accuracies and process speeds are met in comparison to conventional drive systems, and whose susceptibility to faults and maintenance intensity are reduced at the same time.

The stated object is achieved by a woodworking machine having at least one linear direct drive, which has a primary part which has electrical and magnetic excitation, and having a secondary part which has means for providing a magnetic return path and is free of magnetic sources, with the primary part and/or the secondary part being suitable for guiding or setting a workpiece and/or for guiding or setting a tool for machining the workpiece.

In the case of an electrical machine according to the invention which has a primary part and a secondary part, the primary part is designed such that it has two means for producing a magnetic field. The secondary part is free of means for producing a magnetic field. The primary part therefore has a first means for producing a magnetic field, and a further means for producing a magnetic field, in which case an AC voltage or an alternating current can be applied to the first means for producing a magnetic field. The first means for producing a magnetic field, which produces a first magnetic field, is, for example, a winding. The further means for producing a magnetic field, which is an excitation field, is a means that can be used to produce a further magnetic field, that is to say at least one second magnetic field.

The field excitation produced by the further magnetic field is advantageously unchanged during operation, that is to say it is constant. A further means such as this for producing the further magnetic field is, for example, a permanent magnet or a winding to which a constant current is or can be applied. The further means for producing a further magnetic field advantageously has a multiplicity of further means for producing magnetic alternating-pole field excitation.

The first means for producing a first magnetic field is, for example, a coil winding, with the first magnetic field, which emerges from the coil or enters it, being passed to further means (that is to say second, third etc) for producing a further magnetic field, in such a way that at least two further means for producing further magnetic fields are located in the field area of the first magnetic field, thus resulting in the two magnetic fields interacting. The further means for producing further magnetic fields advantageously have a multiplicity of respectively mutually opposite magnetization directions, thus producing an arrangement with alternating-pole magnetization.

The linear direct drive which has a primary part and a secondary part, with the primary part having a first means for producing a first magnetic field and the secondary part having a means for guiding the magnetic field, is therefore designed such that the primary part has at least two further means for producing at least two further magnetic fields, with the first means for producing the first magnetic field being arranged with respect to the further means for producing the further magnetic fields so as to allow further magnetic fields to be superimposed on the first magnetic field.

A linear direct drive designed such as this has the advantage that the secondary part of the electrical machine has no active means for producing a magnetic field. The secondary part of an electrical machine such as this has only a means for guiding magnetic fields, and can therefore be manufactured easily and at low cost. By way of example, the secondary part is laminated in order to avoid any eddy currents.

Soft-iron parts can advantageously be used for the physical design of the primary part and secondary part. Lamination of these parts reduces eddy currents. In further embodiments, the soft-iron parts may also be solid and/or in the form of so-called powder pressings.

The linear direct drive is advantageously a synchronous machine, with the primary part having a first means for producing a first magnetic field and furthermore having a further means for producing a further magnetic field, with the first means being a winding and the further means being at least one permanent magnet. The further means are, in particular, a multiplicity of means, that is to say a multiplicity of permanent magnets. With an electrical machine configuration according to the invention such as this, all the means for producing a magnetic field are located in the primary part. The secondary part has only a means for guiding magnetic fields and, for example, is designed such that it has teeth on the surface facing the primary part. This means is, in particular, a means containing iron, for example a laminated core.

The secondary part and/or the primary part are designed, for example, such that it and/or they has/have teeth. The tooth pitch of the secondary part and the tooth pitch and/or magnet pitch of the primary part may be both the same and different. For example, if the pitch is the same, coils of a motor phase of the direct drive are grouped, and are arranged with an offset of 360°/m with respect to further coil groups in the other motor phases. The number of phases is denoted "m". The tooth pitch of the secondary part (Tau_Sek) indicates the pole pitch of the machine (Tau_p) such that Tau_tooth,sek=2*Tau_p.

In one embodiment of the woodworking machine according to the invention, the tooth pitch of the secondary part is, for example, an integer multiple of the magnet pitch of the primary part. However, it is also possible to design it such that the tooth pitch of the secondary part is not an integer multiple of the magnet pitch of the primary part.

In the case of a linear direct drive in the form of a linear motor, permanent magnets, for example, are integrated in a primary part, to which coils are fitted, on the linear motor. This design has cost advantages, particularly for long movement distances. By way of example, the secondary part of the linear motor then comprises only an iron reaction rail, which may also be a part of the woodworking machine.

The cost advantages of a linear motor such as this result from the fact that, for example, in the past, the linear motor, which is a synchronous linear motor, has a primary part which can be excited electrically and is opposite a secondary part fitted with permanent magnets. This allows an elongated stator structure and a shorter stator structure. In the first case, a very large amount of copper is required, while in the other case a very large amount of magnetic material. Both result in high costs. The permanent magnets accommodated in the secondary part of the already known linear motors form an open path. The magnets (permanent magnets) must be protected against environmental influences such as chips or shavings, oil or other contamination over their entire length, and this is costly. Furthermore, the strong attraction forces of the permanent magnets mean that attention must be paid to personal protection over the entire length of the secondary part. These protective measures also result in costs and in technical complexity. The cost and complexity can be considerably reduced with the aid of a secondary part of the linear direct drive of the woodworking machine according to the invention.

According to the invention, the permanent magnets can be integrated in the primary part such that coils (windings) and magnets (permanent magnets) are accommodated in the same part (primary part) of the linear direct drive. A short-stator structure requires considerably less magnetic material than the known motor principle. Since the primary part is in any case already intrinsically protected against environmental influences, and personal protection is already taken into account there as well, there is no need for any additional protective apparatuses for the secondary part when the magnets are integrated in the primary part. The secondary part advantageously comprises only an iron reaction rail, which presents no hazard.

The linear direct drive for the woodworking machine is advantageously a synchronous machine. Synchronous machines can be controlled precisely and can satisfy stringent requirements for movement accuracy and positioning accuracy. The simple and compact design of the synchronous machine according to the invention results in a very wide range of the advantages already described in principle above.

Cogging torques that occur can be reduced using already known methods. Methods such as these are, for example: inclination of the permanent magnets, inclination of a tooth system, shaping of the teeth on the end faces of the primary parts.

In a further advantageous refinement, the further means for producing a magnetic field (for example a permanent magnet) is imbedded in soft-magnetic-circuit sections and is arranged to concentrate the flux. The arrangement to concentrate the flux allows a high magnetic load level in the electrical machine. The expression imbedding should be understood as meaning that the permanent magnets are positioned in soft-magnetic material such that a soft-magnetic material is entirely or partially adjacent to those sides of the permanent magnets from which the magnetic field emerges.

In a further refinement of the linear direct drive, the secondary part has at least one means for providing a magnetic return path. By way of example, this means is a laminated core. Furthermore, it is advantageous to design the secondary part such that it is free of magnetic sources. By way of example, magnetic sources are permanent magnets or else windings through which an (electrical) current flows.

In one advantageous embodiment, the primary part is modular. The length of the direct drive can be varied by varying the number of teeth and/or the corresponding windings, thus being matched to the requirements of the woodworking machine. Inter alia, this provides the capability to adapt the rated power, of the motor.

In a further refinement, areas of different magnetism alternate in the secondary part. Different magnetism exists, for example, between a soft-magnetic material which can be produced, for example, from iron, and air and/or plastic. The magnetic field can therefore be guided within the secondary part by means of the alternating areas.

In a further embodiment, the secondary part is designed such that it has teeth facing the primary part. The main flux is thus carried within the secondary part via the teeth, and via the magnetic return path which may be provided there. When the flux is carried via the teeth, the flux can be carried, for example, via only one tooth in each case, or via at least two teeth.

In a further advantageous refinement, the intermediate spaces between the teeth which, for example, can also be referred to as bolts, are filled. By way of example, the filling is composed of plastic. Filling means, for example, that no dirt can gather between the teeth. This therefore results in a visually uniform plane. Magnetic differences still exist.

The first means for producing a first magnetic field is advantageously a winding through which electrical current flows. The winding through which electric current flows in a machine or the linear direct drive comprises one or more phases (for example R, Y, B). Each phase is composed of one or more coils. In one advantageous embodiment, the coils are concentrated coils which are each wound around one tooth (tooth coils), in which case the tooth may have one or more poles or permanent magnets. The tooth coil is in this case at least a part of a winding. The coil may be in the form of a single coil or else a split coil. The advantage of the winding is that it can be used in a simple manner to produce a changing magnetic field and, for example, it can be produced by means of an alternating current. The electrical machine can also be designed, for example, such that it has a plurality of windings and coils, and current from different phases of a three-phase source can flow through these windings.

An electrical machine can also be designed such that a secondary part has teeth which are arranged with a pitch separation, Tau_Sec, from one another. The primary part of the electrical machine contains the second means for producing a magnetic excitation field, which is provided by a multiplicity of the means (for example a large number of permanent magnets) which are arranged at a pitch Tau_Prim with respect to one another.

One embodiment of the electrical machine is now distinguished in that the relationship between Tau_Sec and Tau_Prim can be expressed by the following equation:

$$\text{Tau\_Sec} = n * \text{Tau\_Prim} \text{ where } n = 1, 2, 3, \ldots$$

Tau_Sec can therefore be expressed by an integer multiple of Tau_Prim.

In a further embodiment of the electrical machine the relationship between Tau_Sec and Tau_Prim can be expressed by the equation:

$$\text{Tau\_Sec} \neq n * \text{Tau\_Prim} \text{ where } n = 1, 2, 3, \ldots$$

The pitch Tau_Sec is therefore not an integer multiple of the pitch Tau_Prim.

In a further advantageous refinement, the electrical machine according to the invention is connected to a converter. The converter is, in particular, an inverter which can be provided in order to pass current through the first means, in order to produce a first magnetic field. The linear direct drive and the converter form a drive. The electrical machine can therefore also be designed such that the primary part has a plurality of windings in which case current at a different phase angle can flow through the various windings, by using an AC voltage or an alternated current. The use of different phase angles makes it possible to produce a uniform power profile during the movement of the primary part and/or the secondary part of the electrical machine. A uniform power profile such as this can also be achieved by offsetting the phases relating to the position of the various windings on a primary part of an electrical machine with respect to the secondary part, such that this allows power to be developed more uniformly. A phase offset of 120° electrical is therefore advantageously chosen, for example, for a three-phase machine (m=3).

As already described above, a further embodiment of the electrical machine has permanent magnets as further means for producing at least one second magnetic field. The permanent magnets are advantageously arranged on the primary part such that they each produce a magnetic excitation field in different directions.

In one refinement of the arrangement of the permanent magnets, the magnetization directions of the permanent magnets are admittedly parallel, but are alternately in opposite senses.

In a further embodiment, the magnetization directions of the permanent magnets are aligned such that a magnetic alternating flux is produced in those magnetic circuit sections of the primary part to which coils are fitted as a result of the movement of the toothed secondary part, thus resulting in an alternating flux passing through the coil (alternating flux arrangement).

In another embodiment, magnetization directions of the permanent magnets can be aligned such that a pulsating magnetic flux which does not change its sense is produced in the magnetic circuit sections of the primary part to which coils are fitted as a result of the movement of the toothed secondary part, thus resulting in flux passing through the coil in the same sense (same-sense flux arrangement).

Advantageous refinements also exist with respect to the plane on which the magnetic fields are carried. Magnetic fields are, for example, carried on a plane lying transversely with respect to the movement direction (transverse-flux magnetic circuit). This has the advantages that the longitudinal extent of the laminated core of the primary part can be varied by the number of stacked motor laminates.

In a further embodiment, magnetic fields are carried on a plane which is oriented parallel to the movement direction (longitudinal-flux magnetic circuit). This has the advantage that the laminated-core width can be varied by the number of stacked laminates.

It is also advantageous to combine a transverse-flux alignment, that is to say a transverse-flux magnetic circuit, with a longitudinal-flux alignment, that is to say a longitudinal-flux magnetic circuit. This has the advantage that the linear direct drive can be used for different movement directions which, in the case of a linear motor for a woodworking machine, are at angles that are not equal to 0° or 180°.

In a further advantageous refinement, the primary part of the linear direct drive can be used to move not only one secondary part but at least two or more secondary parts. This can be used, inter alia, for workpiece setting in the woodworking machine, in which widely differing secondary parts can be moved by means of one primary part. The primary part is in this case used, for example, for one or more of the following tasks, positioning of the secondary part, acceleration of the secondary part, braking of the secondary part.

The electrical machine can be designed to be sufficiently flexible that either the primary and/or the secondary part can be moved.

In a further refinement of the woodworking machine, the machine has a primary part and two secondary parts. The primary part is arranged between the two secondary parts. This arrangement is designed such that a magnetic circuit which is formed by a useful magnetic flux is closed via the primary part and the two secondary parts.

In a further refinement to the electrical machine, this machine has two primary parts and one secondary part. The secondary part is arranged between the two primary parts. The primary parts and the secondary part can be designed such that a magnetic circuit which is formed by a useful magnetic flux is closed via the two primary parts and the secondary part.

The primary parts and the secondary part may, however, also be designed such that a magnetic circuit which is formed by a useful magnetic flux is closed via in each case one primary part and the common secondary part.

The movement of all the electrical and magnetic components to the primary part of the linear direct drive allows the latter to be designed in an encapsulated form, and allows the secondary part to be technically considerably simpler, more robust and therefore more cost-effective, than in the past.

The secondary part is advantageously in the form of a passive rail composed of magnetically permeable laminated material or solid material. A toothed stamped-out area is the secondary part, that is to say at least two different air-gap thicknesses in the movement direction, can be produced with greater precision than the previously normal magnetic secondary parts. This makes it possible, to directly detect the speed and position actual values, for example by means of a sensor fitted to a primary part, without having to provide any additional magnetic and optical scales along the machining path. The secondary part therefore itself forms the physical embodiment for detection of the speed and position actual values. It therefore forms a robust, integrated measurement system, which is insensitive to dirt.

The simple design of the secondary parts means that secondary parts can be kept in stock, and that a woodworking machine can be upgraded easily and cost-effectively. No magnetic or electrical protective measures are required in open areas of the secondary part.

If the workpiece movement distances are long, at a constant speed, and without any dynamic demand for control, the secondary part geometry may, if required, be a shaped component, in particular a milled component, of the machine body of the woodworking machine.

If the woodworking machine has a plurality of primary parts, then, for example, they may be driven independently of one another as a plurality of separate linear motors, or else jointly as one motor. When a plurality of primary parts are arranged on one plane, for example covering an X-axis and a Y-axis, two-dimensional movement can be provided, by splitting the total number of primary parts into two groups. A first group is provided for movement on the X-axis, and a second group is provided for movement on the Y-axis. The alignment also corresponds to this. These two groups are, for example, distributed on the X-, Y-plane in the form of a checkerboard pattern. An active area of the secondary part is split into two corresponding areas for the X- and Y-movement directions.

BRIEF DESCRIPTION OF THE DRAWING

The invention as well as further advantageous refinements of the invention are disclosed in the schematically illustrated exemplary embodiments. In the FIGS..

DETAILED DESCRIPTION OF PREFERRED EMBODIMENTS

Before explaining woodworking machines with a linear direct drive in more detail, the method of operation and possible embodiments which are relevant for a woodworking machine of a linear direct drive, also referred to in the following text as an electrical machine or as a linear motor, will be described.

Figure 1:
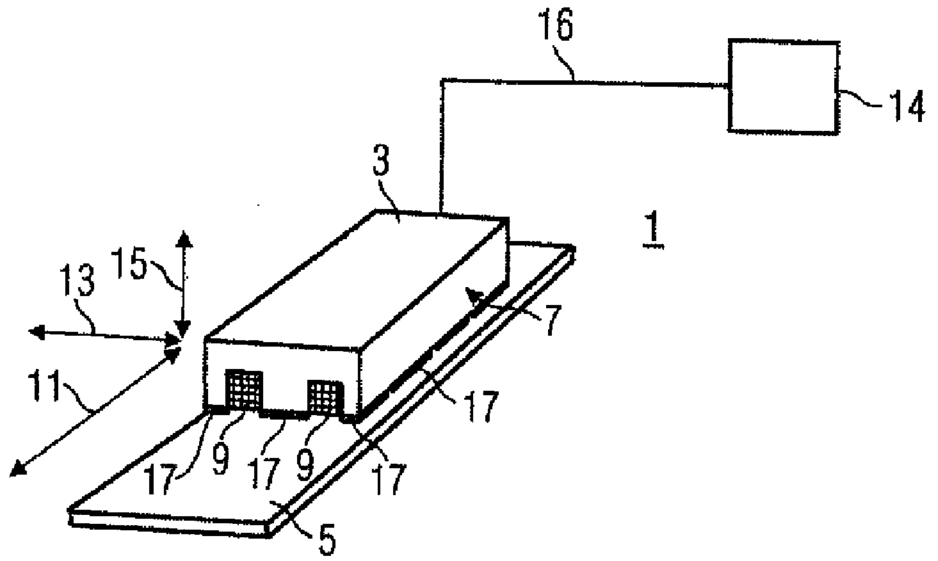
FIG. 1 shows an outline illustration of a linear motor.

The illustration in FIG. 1 shows an electrical machine 1. The electrical machine 1 has a primary part 3 and a secondary part 5. The primary part 3 has a winding 9 and permanent magnets 17. The movement direction of the primary part 3 is indicated by means of a double-headed arrow running in the longitudinal direction 11. A further double-headed arrow indicates the lateral direction 13. A third double-headed arrow indicates the normal 15, with the normal relating to an air-gap plane 19, although the air-gap plane 19 is not illustrated in FIG. 1. The air-gap plane 19 is, however, illustrated in FIG. 2. An arrow indicates a side view 7 which relates to the illustration in FIGS. 3 and 4. The electrical machine 1 is a linear motor which can be driven by means of a converter 14 connected via a connecting cable 16.

Figure 2:
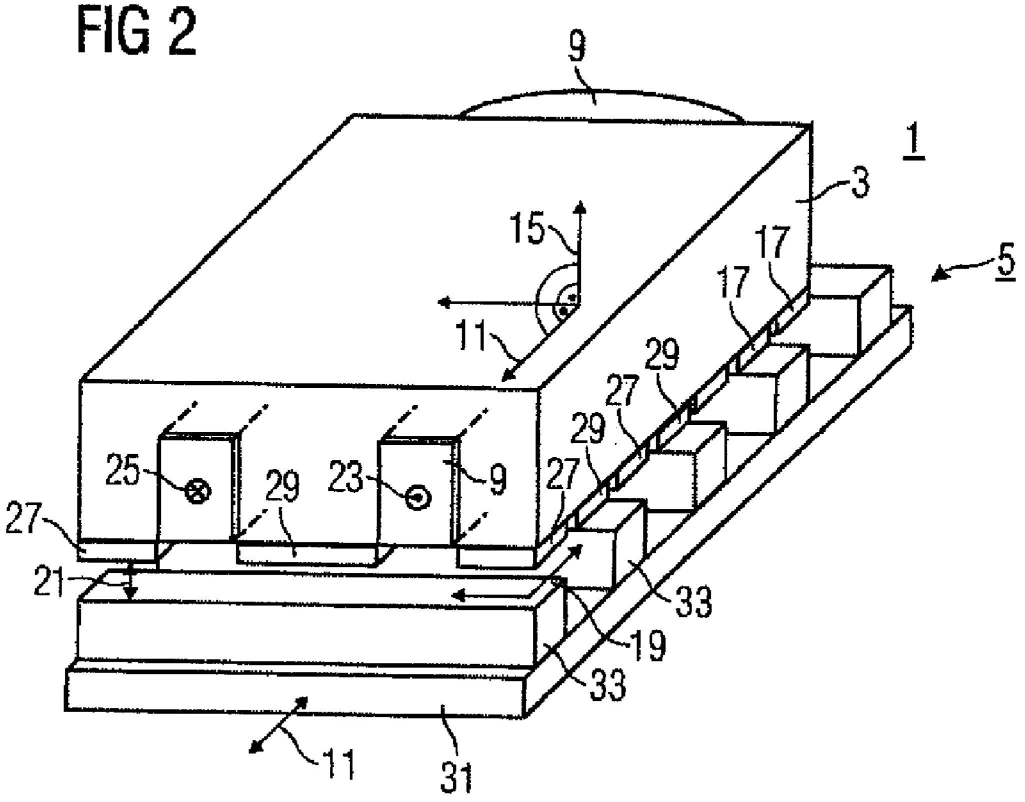
FIG. 2 shows a linear motor with permanent magnets on the primary part.

The illustration in FIG. 2 shows an electrical machine 1. The primary part 3 is in the form of a laminated core, and has a winding 9. The winding 9 is a phase winding, through which an alternating current can be passed. The direction of the current at one instant is illustrated in FIG. 2. In this case, the direction is indicated by means of a dot 23 and by means of a cross 25. The laminated primary part 3 has permanent magnets 17 on the side facing the secondary part 5. The permanent magnets 17 are fitted to the primary part such that their magnetization alternates in the direction of the normal 15.

The magnets (permanent magnets) therefore produce a magnetic flux alternately upward (toward the primary part 3) and downward (toward the secondary part 5). North-south permanent magnets (N-S) 27 (the magnetization direction points toward the secondary part) therefore alternate with south-north permanent magnets (S-N) 29 (the magnetization direction points toward the primary part).

An air gap 21 is formed between the primary part 3 and the secondary part 5. This air gap 21 lies on the air-gap plane 19. The linear direct drive moves in the longitudinal direction 11. In this case, it is possible either for the primary part 3 to be stationary and for the secondary part 5 to move, or for the secondary part 5 to be stationary, and for the primary part 3 to move over the secondary part 5.

The winding 9 is a first means for producing a first magnetic field, and the permanent magnets 17 are further means for producing further magnetic fields. The illustration in FIG. 2 shows a transverse-flux embodiment of the electrical machine 1. In the transverse-flux embodiment, the secondary part 5 is, for example, designed such that it has a mount 31 and bolts 33.

At least the bolts 33 are laminated. The lamination is carried out such that one laminate follows another in the longitudinal direction 11. The bolts 33 are, for example, adhesively bonded, soldered or welded to the mount 31, or are connected to one another in a combination of attachment options. Lamination is advantageous in order to avoid eddy currents. If the negative eddy-current effects are not severely pronounced (for example in applications with a sufficiently low electrical fundamental frequency) there is no need for lamination, and cost-effective solid parts can be used.

Figure 3:
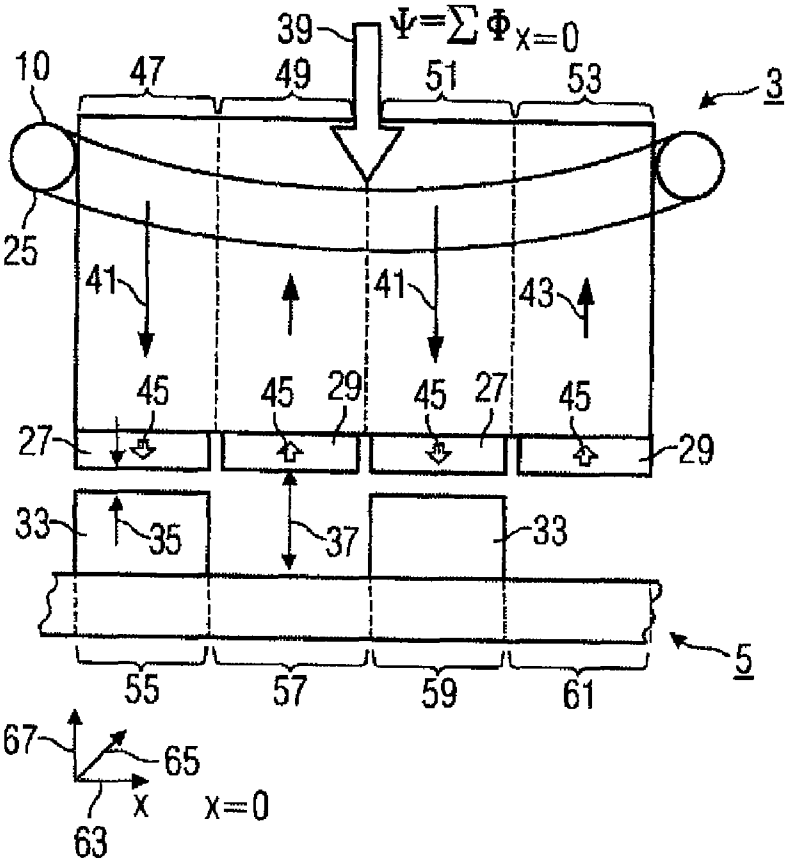
FIG. 3 shows a first profile of magnetic fields in the linear motor.

The illustration in FIG. 3 shows a detail of the primary part 3 and a secondary part 5. This detail in FIG. 3 schematically illustrates how magnetic fields can be split in a primary part 3, with a side view in this case being shown which corresponds to the side view 7 shown in FIG. 1. FIG. 3 shows one turn of a winding 10. It also shows that the primary part 3 and the secondary part 5 can be split into sections. The primary part has primary sections 47, 49, 51 and 53, with these primary sections 47, 49, 51 and 53 relating to the permanent magnets 27, 29.

The sections are in this case areas in which the magnetic flux either runs away from the secondary part 5 or runs toward the secondary part 5, depending on the magnetization direction of the permanent magnets 27 and 29. The profile is illustrated by arrows 41, 43. The sum of all of the magnetic fluxes linked to the winding 10 forms a linked flux Ψ. The linked flux is produced mainly by those magnets which can form a magnetic return path via the secondary part 5. The flux arrows of different length for each magnet indicate the flux linked to the winding (coil).

The secondary part 5 also has sections, corresponding to the bolts 33 that are present. These secondary sections 55, 57, 59 and 61 therefore correspond to the sections in which a bolt 33 is or is not present. A magnetic flux can be carried by means of the bolts 33. In the present example, the magnetic flux is carried at right angles to an illustrated X-axis 63. The flux therefore runs at right angles to the plane of the drawing of which the FIG. 3 is illustrated, with this corresponding to a Y-axis 65. The Z-axis is at right angles to the X- and Y-axes, so that the axes are all mutually perpendicular.

A magnetic excitation flux which is produced, for example, by a north-south permanent magnet 27 has its circuit closed via the bolt 33 and the primary part 3 in a section 47, in conjunction with the section 55. In this case, for example, the primary part 3 has a further permanent magnet behind a first north-south permanent magnet 27 (N-S permanent magnet), which further permanent magnet is magnetized in the opposite direction, so that it is an S-N permanent magnet 29.

However, FIG. 3 does not illustrate a permanent magnet 29 such as this, since this permanent magnet 29 is located behind the view. A narrow air gap 35 is formed at the positions where a bolt 33 is opposite a permanent magnet 27, 29. A wide air gap 37 is formed at adjacent positions without a bolt 33. Since the air gaps 35 and 37 are not the same, magnetic fluxes 41 and 43 of different intensity are produced by permanent magnets 27 and 29 in sections 47, 51 and 49, 53. The resultant flux 39 is formed by the sum of all the fluxes 41 and 43.

Figure 4:
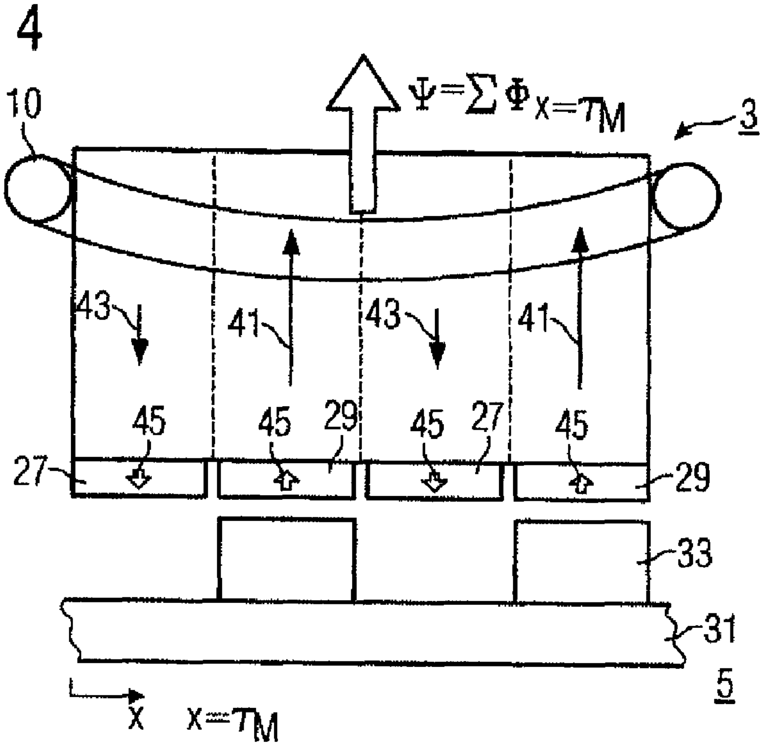
FIG. 4 shows a second profile of magnetic fields in the linear motor.
Figure 5:
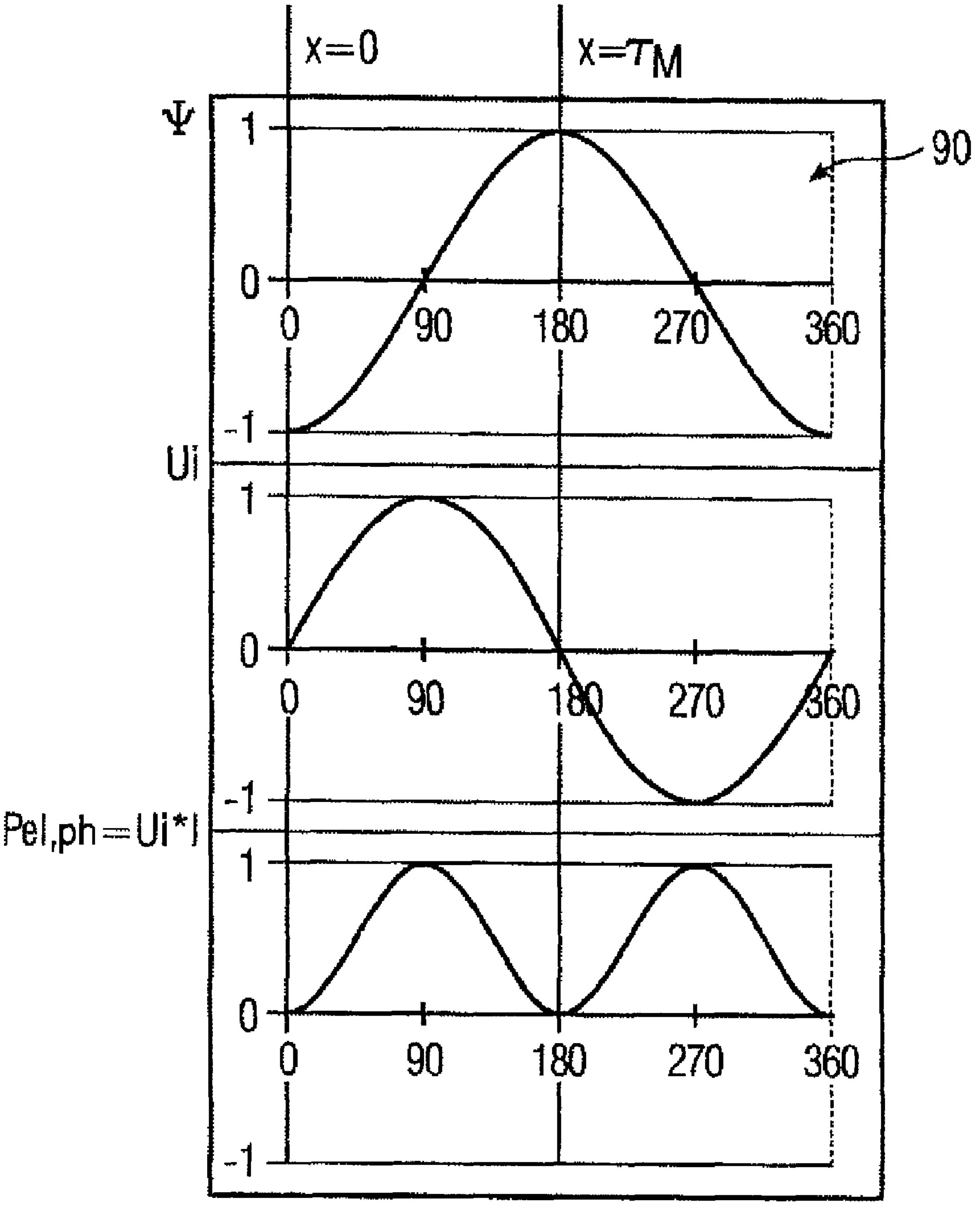
FIG. 5 shows a phase profile of the flux, induced voltage and power.

The illustration in FIG. 3 shows the magnetic excitation flux 41, 43 at the time and for the position of the primary part 3 and secondary part 5 at which the current in the winding 10 is passing through zero. The position-dependent profile of the magnetic excitation flux and of the induced voltage in the winding, and of the power produced in this case, of a motor through which a current is passing are illustrated in FIG. 5. The position of the secondary part X=0 illustrated in FIG. 3 results in a negative linked flux Ψ, while a position, $X=\tau_M$, which is illustrated in FIG. 4, results in a positive flux Ψ. The illustration in FIG. 4 therefore shows the secondary part 5 at a position $X=\tau_M$. Therefore, when the secondary part 5 moves through one magnetic pole pitch, the flux link 39 of the coil (winding 10) therefore gradually changes from a negative value to a positive value. The way in which the change takes place can be influenced by geometry parameters such as the magnet width, air gap, tooth width (width of the bolt 33) etc. In one advantageous refinement the aim is to achieve a variation which is as sinusoidal as possible.

The illustration in FIG. 5 shows the magnetic linked flux Ψ, the induced voltage $U_l$ resulting from this and the electrical power $P_{el,ph}$ of a phase/winding in the form of three graphs plotted against time. The phase profile is represented by the indication of the phase position of the voltage. The profile of the flux Ψ also reflects the profile of the magnetic field 90 which, for example, can be produced by means of permanent magnets. For optimum power to be formed from one phase, the current must flow in phase with the induced voltage. Furthermore, the positions X=0 and $X=\tau_M$ are shown, with these positions together with the further illustrated profiles of the flux Ψ, voltage $U_i$ and electrical power $P_{el,ph}$ relating to the symbolic illustration in FIGS. 3 and 4. The third graph, in which the electrical power is plotted, shows that the number of motor phases m must be greater and/or equal to 2 for a constant power (~force). Three phases are advantageously chosen since three-phase converters require fewer semiconductor valves than those having two phases or more than two phases.

Figure 6:
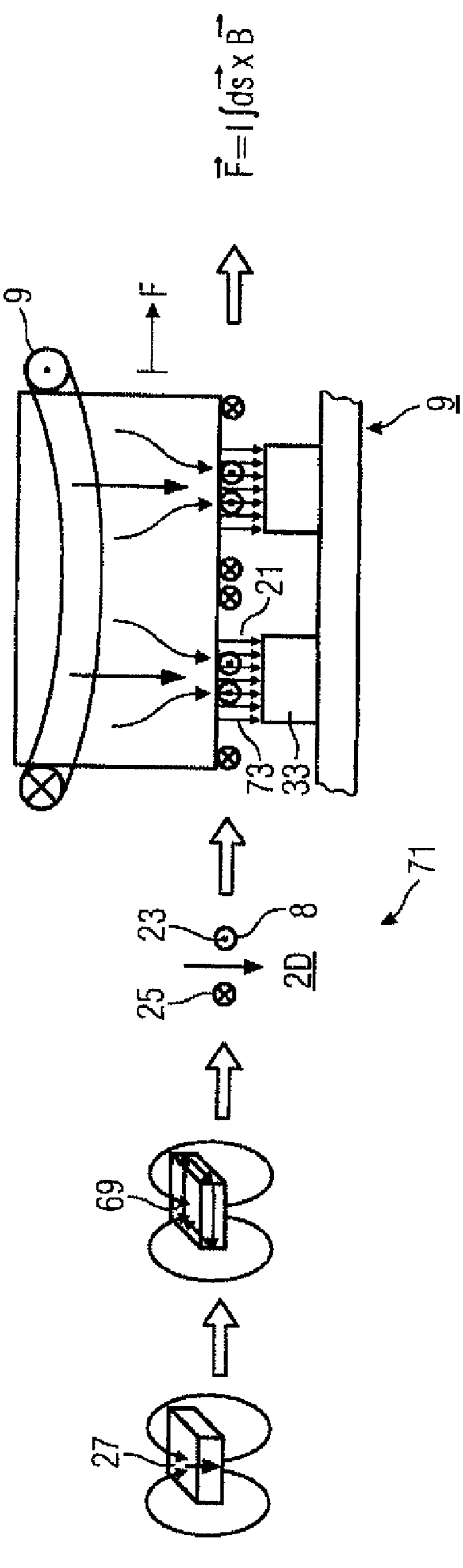
FIG. 6 shows an illustration of the power that is developed.

The illustration in FIG. 6 is intended to show the technical principle, and illustrates the production of a force F. In order to make the formation of the force in the longitudinal direction of a linear motor somewhat clearer, an auxiliary model is introduced. A permanent magnet 27 is replaced by currents on an envelope surface associated with it. The permanent magnet 27 can therefore be represented, for example, in an imaginary form by a cuboid, with current flowing on the side surfaces of the cuboid 69, as illustrated. The permanent magnet 27 can therefore be represented in a model 71 by a winding, in which case, according to the model, the direction of the current within the winding is represented by a dot 23 or a cross 25. In the illustration 2D the magnet is reduced to the conductor cross section of the equivalent currents. If the magnets are now substituted in the side view of the primary part, this results in the following arrangement. The magnetic field produced by the winding 9 is concentrated in the air gap 21 at the locations of the bolts 33, which are used as flux guides, since this is where the least magnetic reluctance occurs. The fictional conductors are therefore located in the field of the phase coil, increasing it on one side and weakening it on the other side. The conductors "soften" in the area of reduced film strength, as is illustrated by the direction of the force F acting on the primary part in FIG. 6. This relationship is also described by the "right-hand rule", in which the current, the magnetic field and the force F are mutually perpendicular. When the primary part 3 and the secondary part 5 are in the position with respect to one another $X=\tau_{M/2}$ illustrated in FIG. 6, the phase current, that is to say the current through the winding 9, reaches its maximum.

Figure 7:
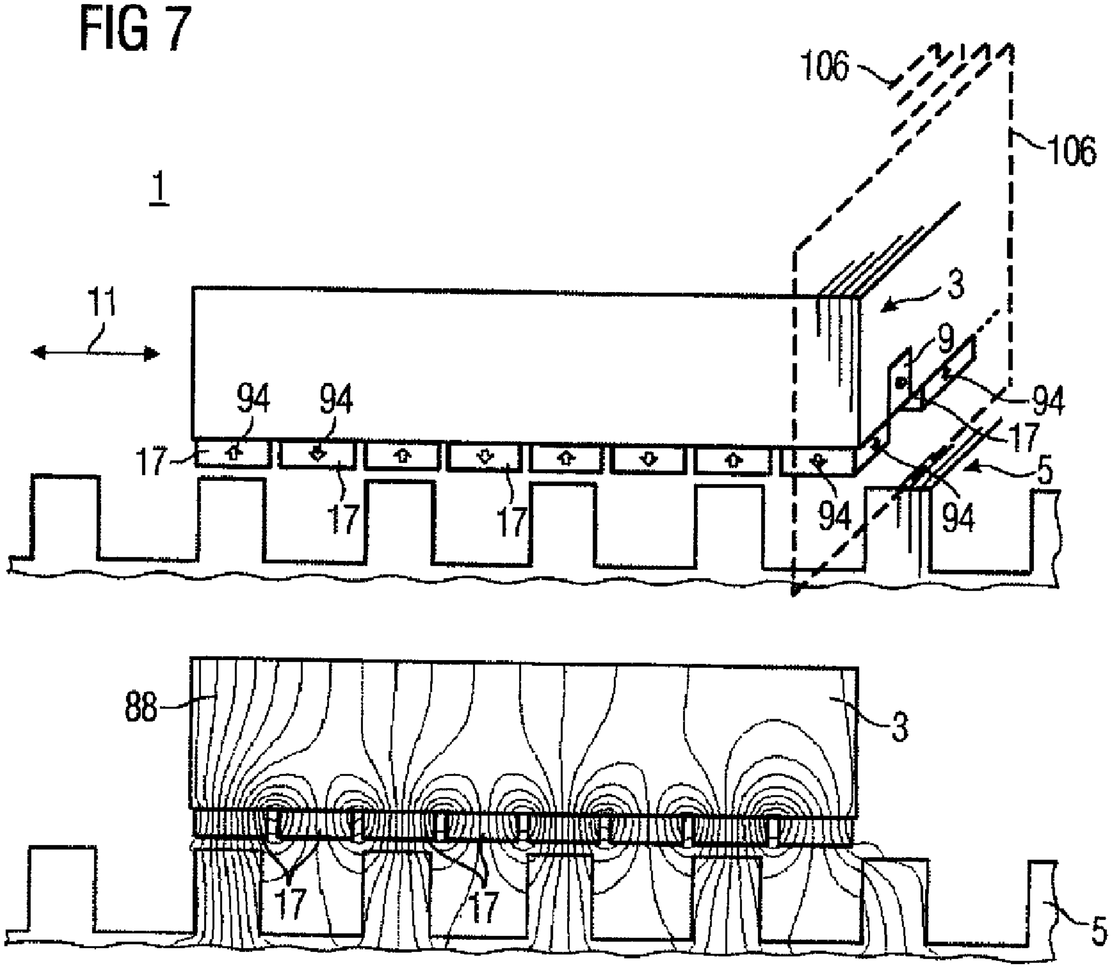
FIG. 7 shows the geometry and the field of a linear motor with transverse-flux alignment.

The illustration in FIG. 7 shows, schematically, the geometry of a transverse-flux linear motor 1 and a magnetic excitation field 88, which is produced by the permanent magnets 17. A useful magnetic flux is carried on a plane 106 aligned transversely with respect to a movement direction 11. The useful magnetic flux is the magnetic flux which is coupled or linked to the coil 9. This useful magnetic flux aligned in this way forms a transverse-flux magnetic circuit.

The excitation field 88 in FIG. 7 is the further magnetic field or the further magnetic fields. The linear motor 1 has a laminated primary part 3 and a laminated secondary part 5. The stacking direction of the laminated cores is indicated in principle. The magnetization direction 94 of the permanent magnets 17 is illustrated by means of arrows. The possible movement direction of the primary part is the longitudinal direction 11.

Figure 8:
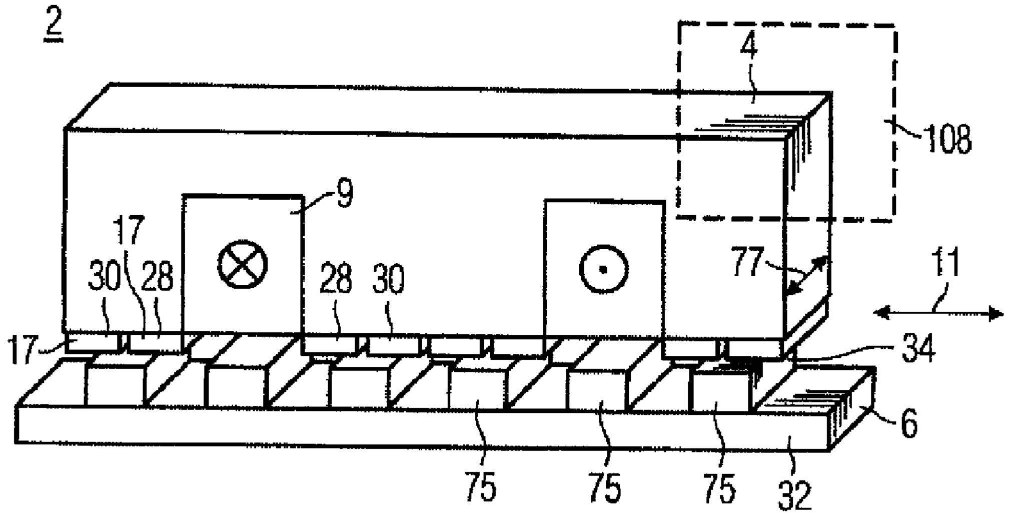
FIG. 8 shows a perspective view of a linear motor with longitudinal-flux alignment.

The illustration in FIG. 8 shows a primary part 4 and a secondary part 6. The primary part 4 and the secondary part 6 form the electrical machine 2, with the electrical machine 2 having a longitudinal-flux arrangement. The longitudinal-flux arrangement is distinguished in particular in that the magnetic fields are not closed transversely with respect to the movement direction of the primary part or of the secondary part, but along the movement direction of the primary part or along the movement direction of the secondary part. The magnetic flux which is carried on a plane 108, with the plane 108 being oriented parallel to the movement direction 11, is a useful magnetic flux. The useful magnetic flux is that magnetic flux with is coupled to the coil 9. This useful magnetic flux aligned in this way forms a longitudinal-flux magnetic circuit.

The secondary part 6 shown in FIG. 8 is laminated both in the area of the mount 32 and in the area of the bolt 34. In contrast with the transverse-flux arrangement, the magnets are not arranged in a form of a checkerboard on the air-gap plane, but in the form of strips. In the case of the longitudinal-flux variant, the magnets are aligned essentially parallel to the bolts (flux guides). However, in order to reduce force ripple, the magnets may deliberately be positioned inclined.

In a further advantageous refinement, the secondary part 6 is produced from laminates which are stacked one behind the other over the motor width. In the case of laminates such as these the mount 32 and the teeth 75 are composed from one part. The toothed structure of the secondary part with the bolts 34 is obtained by stacking the laminates one behind the other. The nature of the lamination is indicated in FIG. 8. By way of example, the secondary part may be formed from a plurality of parts in the longitudinal direction, such that one secondary part 6 is adjacent to a next secondary part. Such further secondary parts which are adjacent in the movement direction are, however, not shown in the illustration in FIG. 8. The illustration in FIG. 8 also shows the permanent magnets. The permanent magnets are N-S permanent magnets 28 or S-N permanent magnets 30. These permanent magnets extend, for example, over the entire width 77 of the laminated core of the primary part 4.

Figure 9:
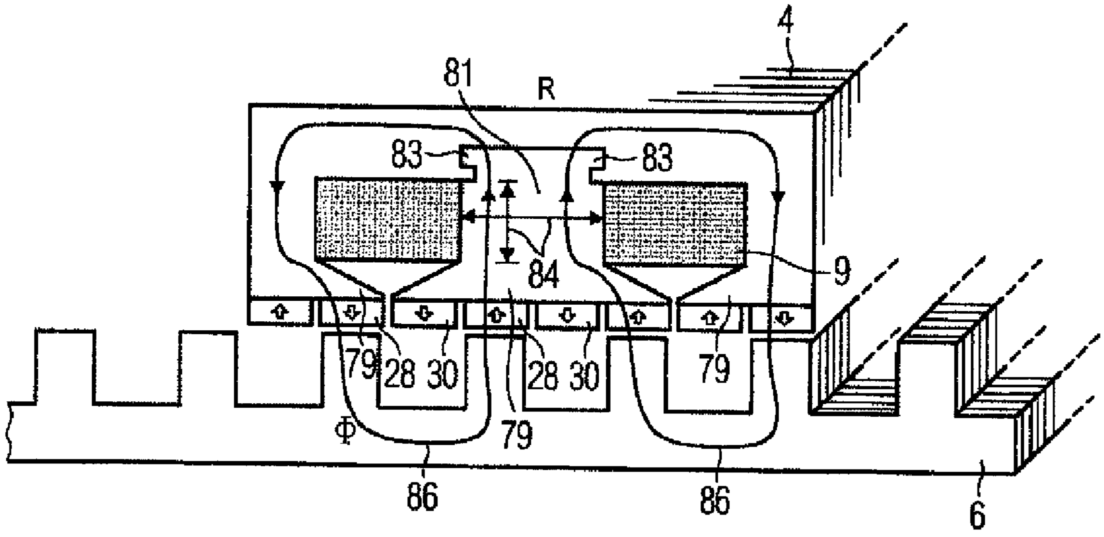
FIG. 9 shows a linear motor with a primary part having one pole shoe.

The illustration in FIG. 9 shows a further development of an electrical machine 2 as shown in FIG. 8. The primary part 4 is in this case designed such that it has pole shoes 79. The pole shoes 79 broaden the contact area for permanent magnets 28, 30. This makes it possible to increase the force produced by the electrical machine 2. Since the enlargement of the area for positioning of the permanent magnets narrows the area in which a winding 9 can be inserted in the primary part, the primary part 4 is advantageously designed to have a winding former 81. The winding former 81 has both a pole shoe 79 and a winding neck 84. The winding 9 can be wound around the winding neck 84 and can then be inserted into the primary part 4. The winding former 81 is advantageously held in the primary part by means of tabs 83. FIG. 9 shows the winding 9 as one phase R of a motor. Further motor phases (for example Y and B) can be provided by physically identical primary parts 4, although this is not illustrated. In the illustrated position, the permanent magnets 28 and 30 produce the magnetic excitation fluxes 86, whose sum forms the flux link Ψ for the coil 9. As can be seen from the illustration in FIG. 9, the magnetic excitation fluxes 86, which represent a useful flux, form a longitudinal-flux magnetic circuit.

Figure 10:
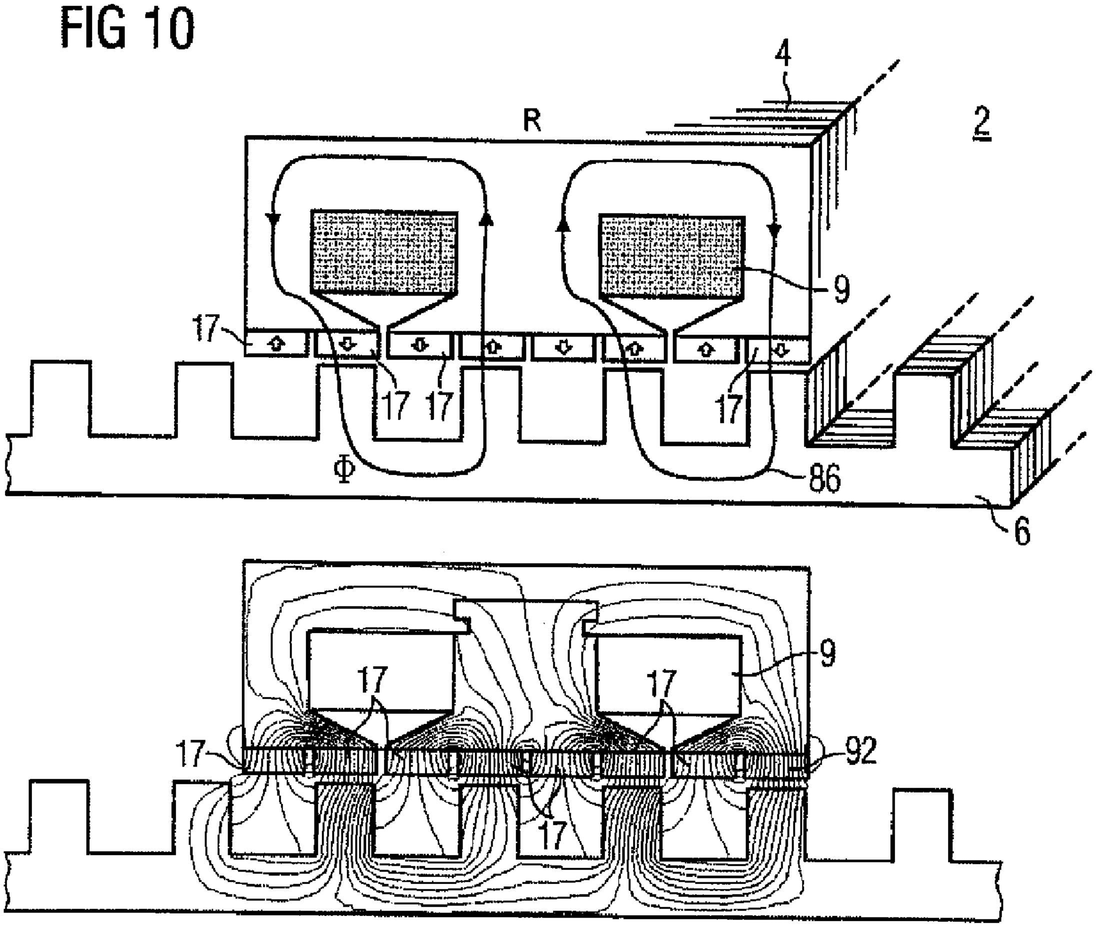
FIG. 10 shows the geometry and field of a linear motor with longitudinal-flux alignment.

The illustration in FIG. 10 shows a linear motor 2 with a longitudinal-flux magnetic circuit. This corresponds to the illustration shown in FIG. 9. FIG. 10 also shows the distribution of the further magnetic fields 92, in an illustration offset downward in the FIG. These further magnetic fields 92 are the magnetic excitation field which is caused by the permanent magnets 17.

Figure 11:
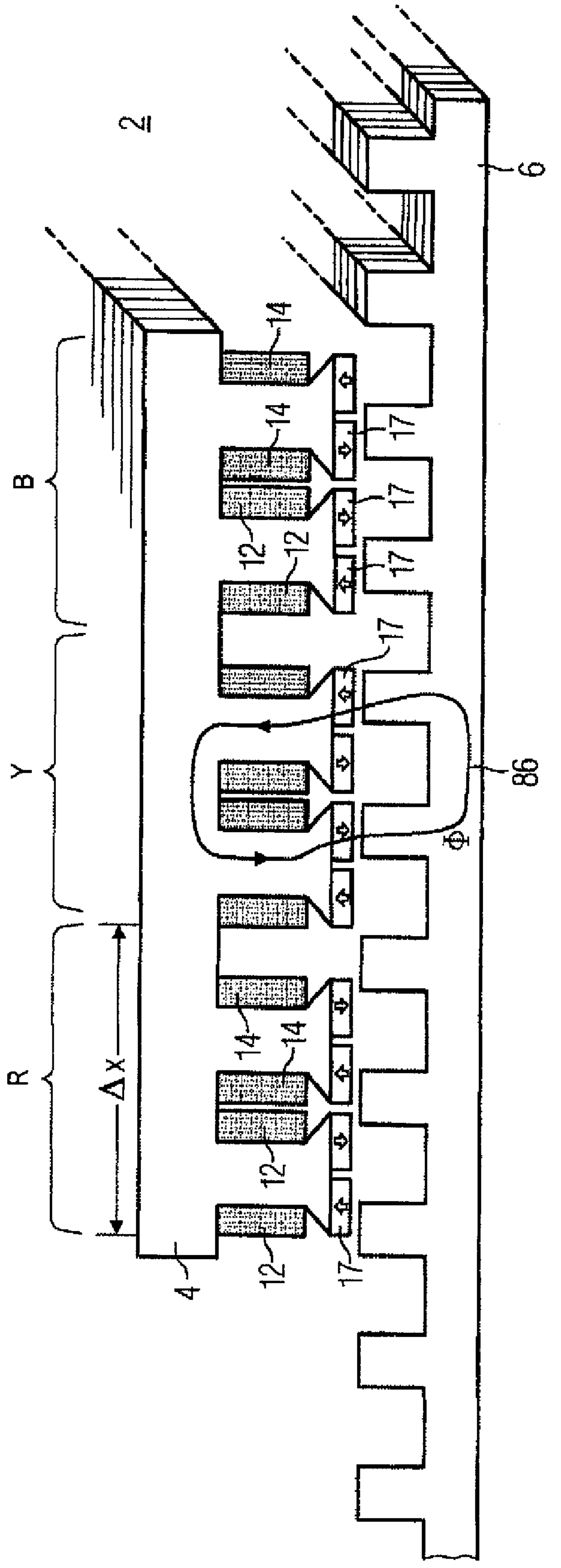
FIG. 11 shows a linear motor with different winding sections for different phases.

The illustration in FIG. 11 shows a further exemplary embodiment of an electrical machine 2, in which this machine can now be formed from three winding sections R, Y and B. Each winding section is intended for one phase of a three-phase power supply system. The required phase shift is achieved by geometrically offsetting the winding sections with respect to one another. The geometric offset Δx in this case corresponds to 120° electrical for the illustrated three-phase machine. FIG. 11 also differs from FIG. 10 in that, for example, each phase R, Y and B is associated not only with a tooth coil 9 but with two tooth coils 12 and 14 thereof for a respective phase R, Y and B.

Figure 12:
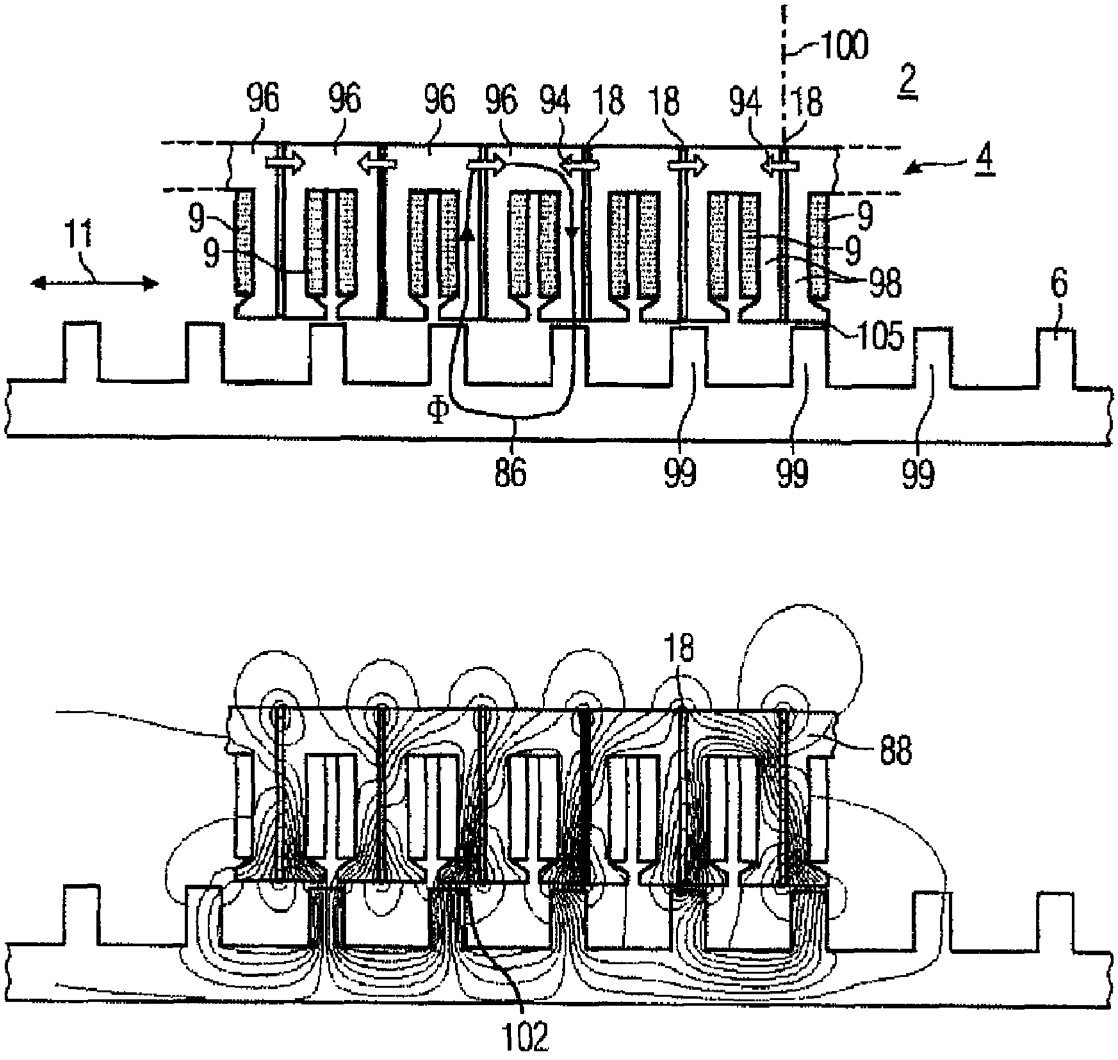
FIG. 12 shows the geometry and field of a linear motor with toothed magnets for flux concentration.

The illustration in FIG. 12 shows a linear direct drive, with toothed magnets 18 being used as permanent magnets here. The toothed magnets 18, which are actually also permanent magnets, are located, for example, between laminated soft-iron material elements 96. The further magnetic field 86 is produced by the toothed magnets 18 and is annotated by lines with arrows. The magnetization direction 94 of the permanent magnets 18 is likewise indicated by arrows. The toothed magnets 18 are positioned essentially centrally in a tooth 98 and run essentially parallel to a coil axis 100 of the tooth coil 9. The tooth 98 is surrounded by a tooth coil 9. The upper half of FIG. 12 shows the geometric configuration, and the lower half of the FIG. the profile of the magnetic excitation field 88. The magnetic excitation field 88 is the further magnetic field which is produced by means of the toothed magnets 18. The illustration of the excitation field 88 in this case clearly shows the effect of the flux concentration 102. The flux concentration is governed by the magnetic-circuit geometry. Influencing variables are, in this case by way of example, the magnet dimensions and the laminated section dimensions. The magnetization direction 94 of the toothed magnets 18 (the toothed magnet is a permanent magnet) is mainly parallel to an air-gap plane of the air gap 105.

The tooth pitch of the secondary part 6 of the electrical machine 2 as shown in FIG. 12 is not an integer multiple of the magnet pitch of the primary part 4. This applies in particular to the mean value, if the tooth pitch or magnet pitch is not constant.

The current from one and/or more phases can flow through the coils 9. The association of the coils with the individual motor phases depends on the chosen tooth pitch ratio between the primary part 4 and the secondary part 6. The illustration in FIG. 12 shows a different tooth pitch than for the teeth 99 of the secondary part 6, for the teeth 98 of the primary part 4. In this case, a polyphase electrical machine can be provided both for an equal and for an unequal tooth pitch on the primary and secondary parts. By way of example, FIG. 7 and FIG. 11 illustrate an equal tooth pitch.

Figure 13:
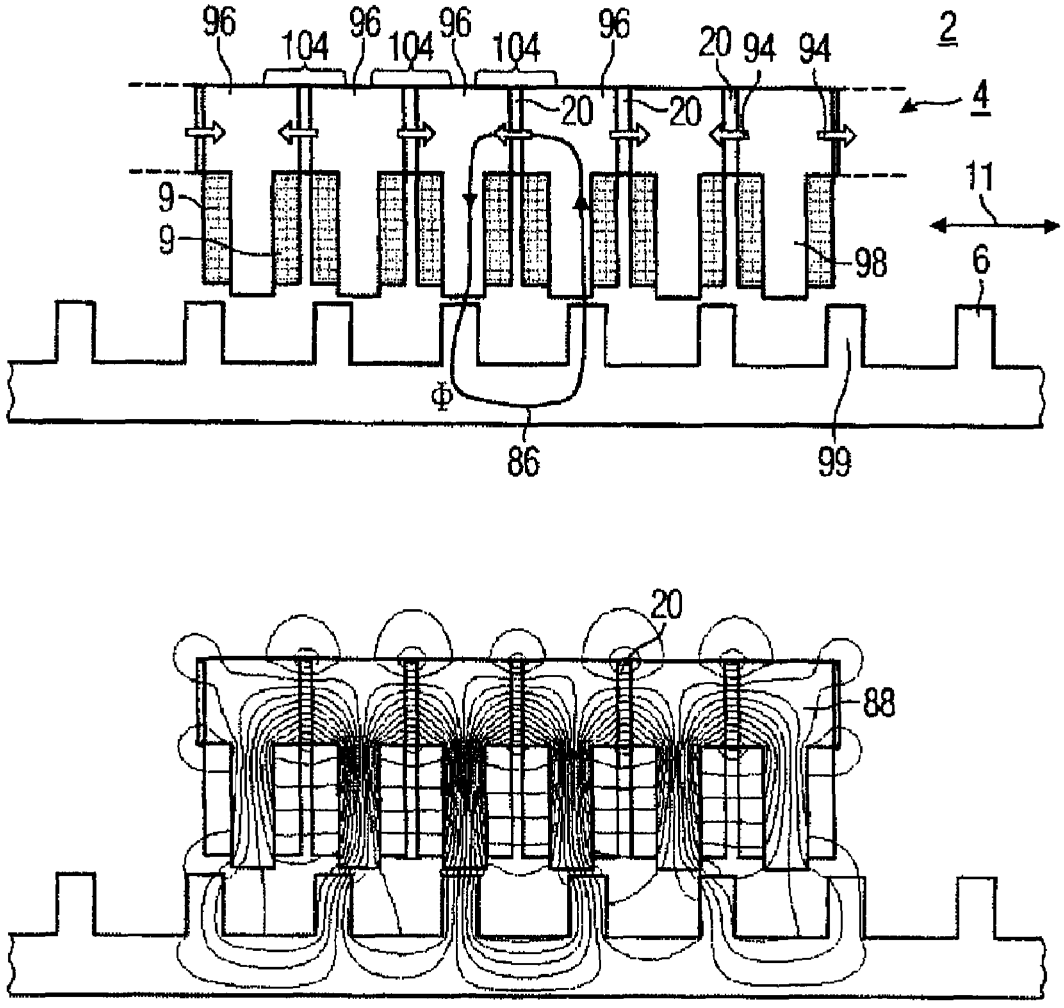
FIG. 13 shows the geometry and field of a linear motor with yoke magnets for flux concentration.

The illustration in FIG. 13 differs from the illustration shown in FIG. 12 essentially in that yoke magnets 20 are now used rather than toothed magnets as the further means for producing further magnetic fields. The yoke magnets 20 are also permanent magnets, and are positioned in the area of a yoke 104. The yoke 104 is used to connect teeth 98. The positioning of the magnets in comparison to FIG. 12 also results in a different excitation field 88 in FIG. 13.

Figure 14:
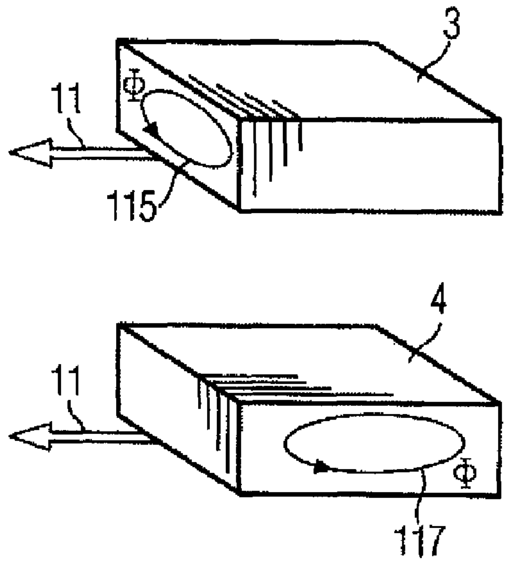
FIG. 14 shows a comparison of a primary part with a transverse-flux magnetic circuit and of a primary part with a longitudinal-flux magnetic circuit.

The illustration in FIG. 14 shows, schematically, a comparison of a primary part 3 with a transverse-flux magnetic circuit 115 and a primary part 4 with a longitudinal-flux magnetic circuit 117. The primary parts 3, 4 are, in particular, primary parts 3, 4 of a synchronous motor with permanent-magnet excitation, which is not illustrated in this FIG., and which has permanent magnets in the primary part, with the permanent magnets likewise not being illustrated in this figure. The magnetic flux $\phi$ is in each case indicated only symbolically. Further means for producing the magnetic flux $\phi$, for example windings through which current can be passed, are also not illustrated, for the sake of clarity. One possible movement direction 11 is indicated by an arrow. A secondary part which is associated with the respective primary parts 3 and 4 is not illustrated in FIG. 14. The illustration also shows that the configuration of the lamination in the primary parts 3 and 4 depends on the alignment of the respective magnetic circuit 115 and 117. In the case of the transverse-flux magnetic circuit 115, the magnetic excitation flux ϕ circuit is mainly closed on a plane aligned transversely with respect to the movement direction 11. The motor laminates used for lamination of the primary part 3, 4 follow the flux plane and, for example, are stacked in a longitudinal extent of the primary part 3, with the longitudinal extent being the extent of the primary part 3 in the movement direction 11.

Figure 15:
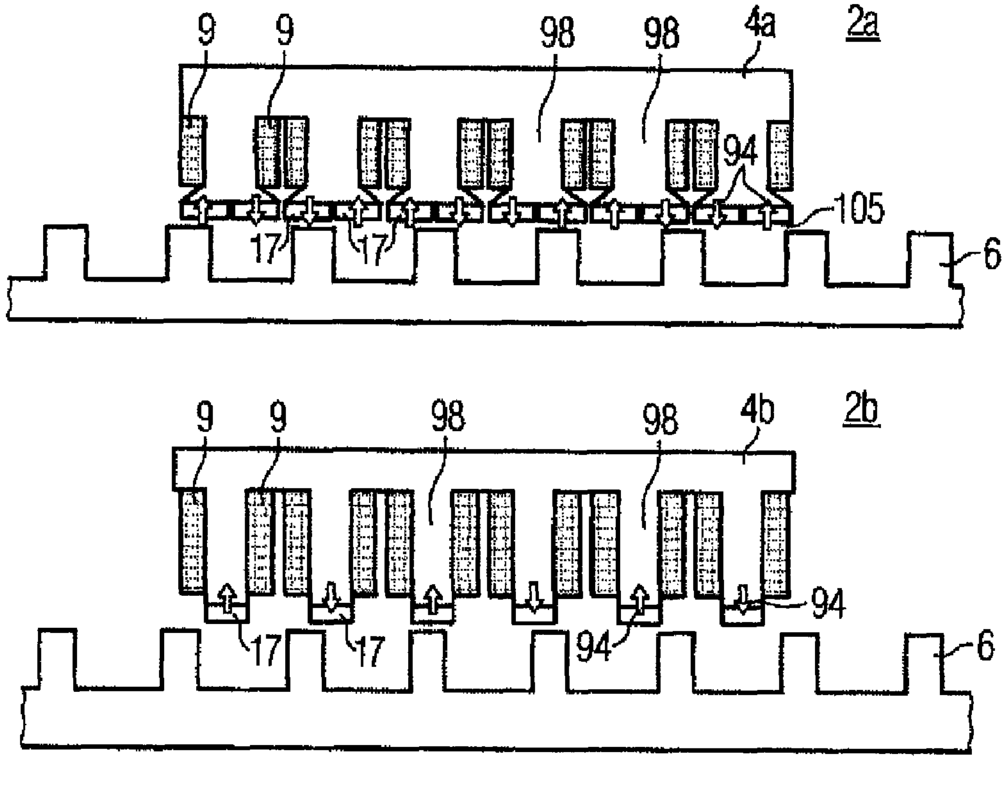
FIG. 15 shows a comparison of electrical machines with an alternating-flux arrangement and a same-sense flux arrangement.

The illustration in FIG. 15 shows a comparison of electrical machines 2*a* and 2*b* which are linear motors. The electrical machine 2*a* has a primary part 4*a* which has teeth 98, with permanent magnets 17 which have a different magnetization direction 94 being fitted in each case to one tooth 98. The permanent magnets 17 are fitted to the side of the primary part facing an air gap 105. The magnetization direction 94 of the permanent magnets 17 is mainly at right angles to an air-gap plane.

As shown in FIG. 15, one tooth coil 9 is wound around each of the teeth 98. Since each of the teeth 98 now have permanent magnets 17 with opposite magnetization directions 94, this results in a magnetic alternating flux relative to the secondary part 6 during movement of the primary part 4*a*. The electrical machine 2*a* therefore has an alternating-flux arrangement. A magnetic alternating flux is produced in the magnetic circuit during relative movement of the secondary part 6 with respect to the primary part 4*a*, by means of the permanent magnets 17, which are used to form a (magnetic) excitation field. The magnetization directions 94 of the individual permanent magnets 17 are therefore aligned such that a magnetic alternating flux is produced by a movement of the toothed secondary part 6 in the magnetic-circuit sections of the primary part 4*a* in which coils are fitted.

The electrical machine 2*b* in FIG. 15 also has a primary part 4*b* which has teeth 98. In contrast to the electrical machine 2*a*, the teeth 98 in the electrical machine 2*b* have only one permanent magnet 17 for each tooth 98. Since the permanent magnet 17 has a magnetization direction 94, each tooth 98 is associated with only one magnetization direction 94. An electrical machine 2*b* can also be designed in such a way that one tooth 98 has a plurality of permanent magnets, but these each have the same magnetization direction with respect to a tooth 98. This embodiment variant is not illustrated explicitly in FIG. 15.

In the electrical machine 2*b*, the magnetization directions 94 also change with the teeth 98 on the primary part 4*b*. Each tooth therefore alternately has a different magnetization direction 94. Since the teeth 98 now have permanent magnets 17 with opposite magnetization directions 94, this results in a magnetic flux in the same sense during movement of the primary part 4*b* relative to the secondary part 6. The electrical machine 2*b* therefore has a same-sense flux arrangement. A magnetic flux in the same sense is produced in the magnetic circuit during relative movement of the secondary part 6 with respect to the primary part 4*b*, by means of the permanent magnets 17, which are used to form a (magnetic) excitation field. The magnetization directions 94 of the individual permanent magnets 17 in the electrical machine 2*b* shown in FIG. 15 are aligned such that a movement of the toothed secondary part 6 in the magnetic-circuit sections of the primary part 4*b* which are fitted with coils leads to a magnetic flux in the same sense, with the magnetic flux in the same sense not changing its direction and oscillating between a maximum value and a minimum value, periodically.

Figure 16:
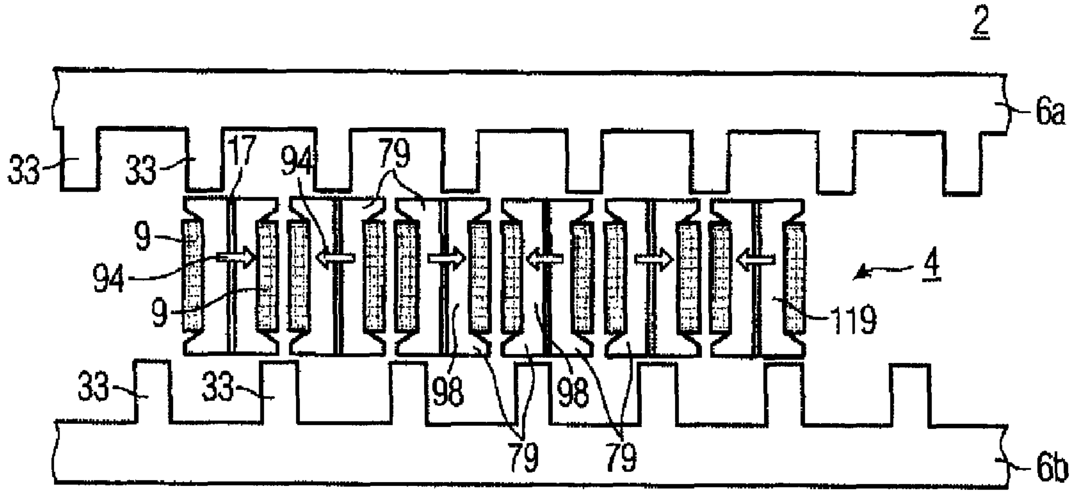
FIG. 16 shows an electrical machine with secondary parts arranged on two sides.

In the illustrations shown in FIG. 15 or else FIG. 12, an arrangement has been chosen in which a force effect can be achieved between a primary part and a secondary part. The illustration in FIG. 16 shows an arrangement of an electrical machine which has a primary part 4 and two secondary parts 6*a* and 6*b*. A force effect is therefore produced between only one primary part 4 and two secondary parts 6*a* and 6*b*. This results in the force that can be produced being approximately doubled. The teeth 98 of the primary part 3 of the linear motor as shown in FIG. 16 each have two pole shoes 79, with one secondary part 6*a* or 6*b* facing each pole shoe 79. This embodiment of the electrical machine 2 as shown in FIG. 16 is a type of development of the electrical machine 2 shown in FIG. 12.

The arrangement of the secondary parts on two sides is in this case not restricted to the embodiment of the primary part 4 illustrated in FIG. 16, in which the permanent magnets 17 are embedded in a soft-magnetic material 119. Primary parts are also feasible which have permanent magnets on the pole shoes.

Figure 17:
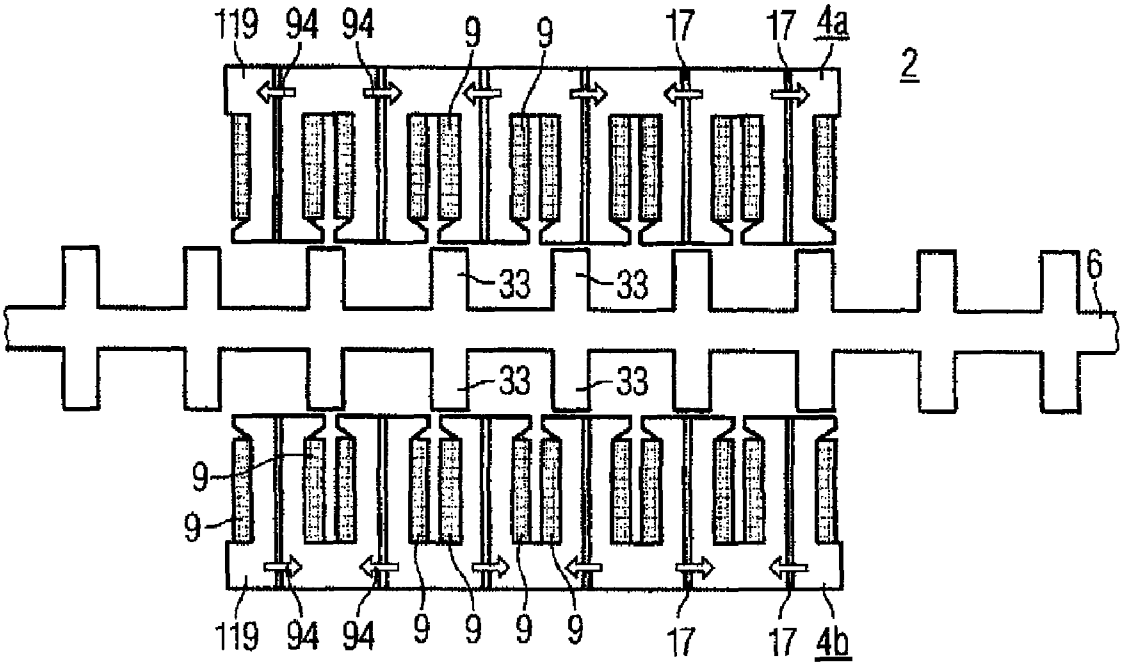
FIG. 17 shows an electrical machine with primary parts arranged on two sides.

The illustration in FIG. 17 shows an arrangement of an electrical machine 2 which has two primary parts 4*a* and 4*b* and only one associated secondary part 6. A force effect is therefore produced between only one secondary part 6 and two primary parts 4*a* and 4*b*. This results in the force that can be produced being approximately doubled. The teeth 3 on the secondary part of the linear motor 2 shown in FIG. 16 have a respective primary part 4*a* and 4*b* aligned on each of the two sides. Teeth 33 on the one secondary part 5 are therefore associated with each primary part 4*a* and 4*b*. This embodiment of the electrical machine 2 shown in FIG. 17 is a type of development of the electrical machine 2 shown in FIG. 12. The arrangement of the primary parts 4*a* and 4*b* on two sides is in this case not restricted to the embodiment of the primary part 4*a* illustrated in FIG. 16, in which the permanent magnets 17 are embedded in a soft-magnetic material 119. It is also possible to use primary parts which have permanent magnets on the pole shoes, for example as shown in FIG. 10.

Figure 18:
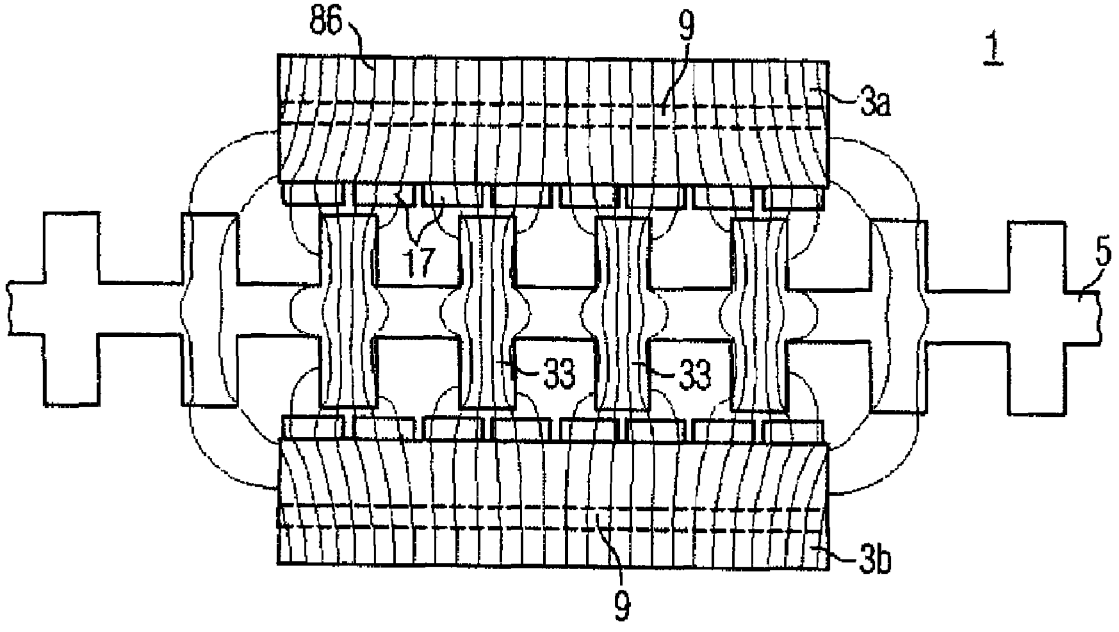
FIG. 18 shows a magnetic field profile of a transverse-flux magnetic-circuit arrangement, produced by an electric current.

By way of example, the illustration in FIG. 18 shows the magnetic field profile for an electrical machine 1 which has two primary parts 3*a* and 3*b* and one secondary part 5. The primary parts 3*a* and 3*b* have permanent magnets 17 and a winding 9. The illustration in FIG. 18 shows the magnetic flux 86 which results from a current through the winding 91 which is represented by dashed lines, of the primary parts. The magnetic flux 86 illustrated in FIG. 18 ignores the magnetic flux produced by the permanent magnets.

Figure 19:
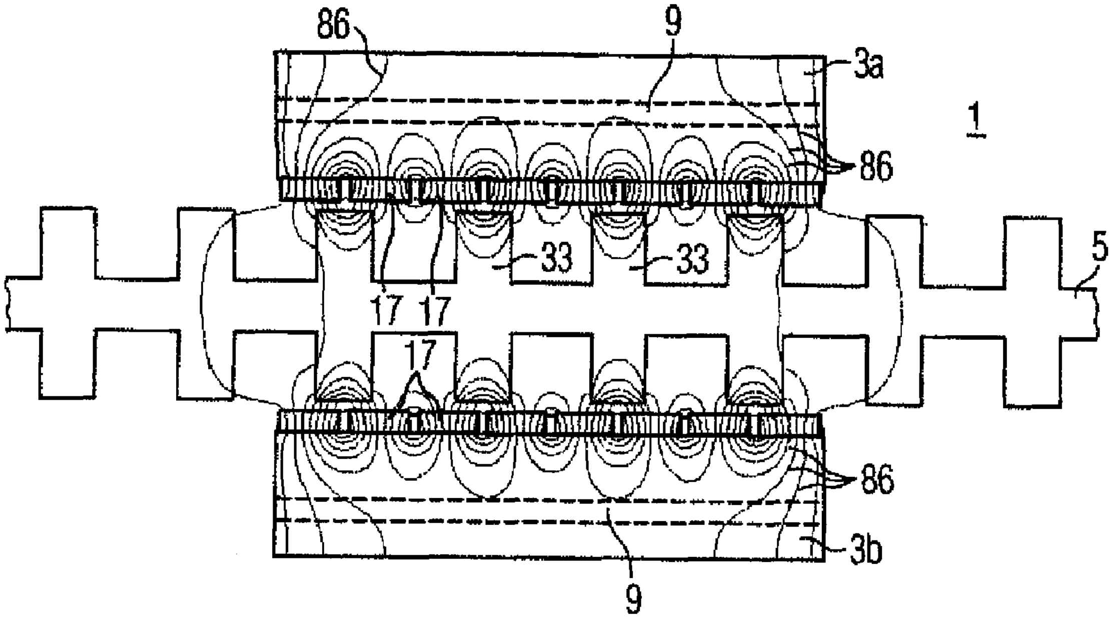
FIG. 19 shows a magnetic field profile of a transverse-flux magnetic-circuit arrangement, produced by permanent magnets.

The illustration in FIG. 19, like FIG. 18, shows, by way of example, the magnetic field profile for an electrical machine 1 which has two primary parts 3*a* and 3*b* and one secondary part 5, with the magnetic field profile illustrated in FIG. 19 being produced just by the permanent magnets 17. The magnetic flux 86 illustrated in FIG. 19 ignores the magnetic flux produced by the primary part windings 9, through which current can flow.

Figure 20:
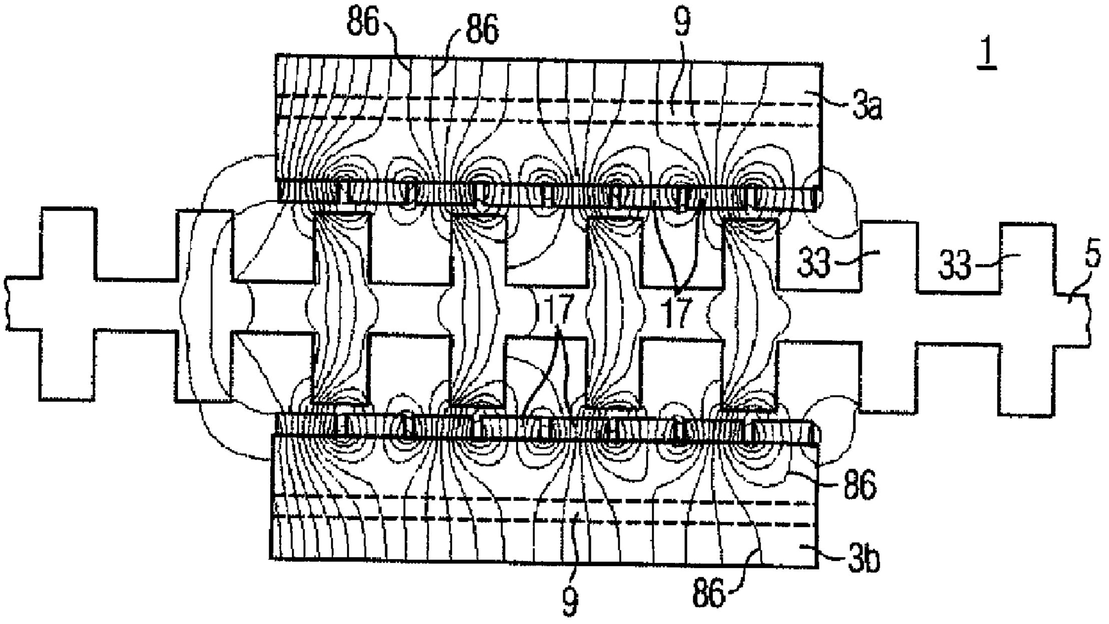
FIG. 20 shows a magnetic field profile of a transverse-flux magnetic-circuit arrangement, produced by an electric current and by permanent magnets.

Like FIGS. 18 and 19, the illustration in FIG. 20 shows, by way of example, the magnetic field profile for an electrical machine 1 in which the magnetic fields from the permanent magnets 17 and from the winding 9 through which current can pass are now superimposed. FIG. 20 therefore shows the superimposition of the magnetic fields illustrated individually in FIG. 18 and in FIG. 19. Furthermore, FIG. 20 shows that the secondary part 5 is arranged between two primary parts 3*a* and 3*b*, with this arrangement being used to form a common magnetic circuit, which affects both primary parts 3*a*, 3*b* and the secondary part 5.

FIG. 21 to FIG. 24 now show fundamental principles relating to the arrangements of linear direct drives on woodworking machines.

Figure 21:
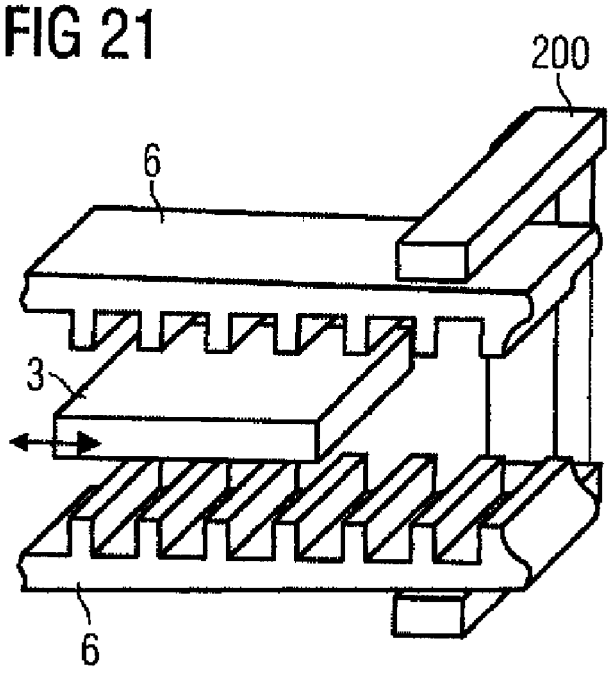
FIGS. 21-24 show outline arrangements of the linear direct drives for a woodworking machine.

FIG. 21 shows a mounting structure 200, to which secondary parts 6 are attached as a toothed iron structure. The U-shaped configuration of the mounting structure 200 results in one secondary part 6 in each case on the upper limb and the lower limb, so that, in the center, the primary part 3, which has windings and magnets that are not illustrated in any more detail, can carry out a linear movement, as illustrated by the arrow 211.

Figure 22:
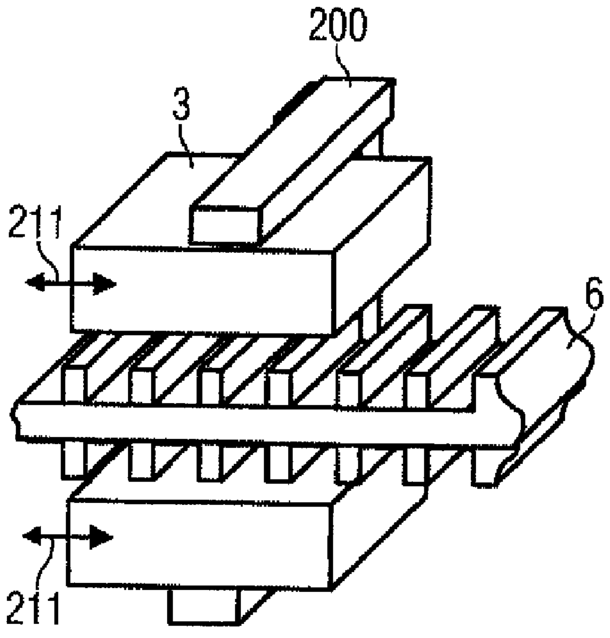

The mounting structure 200 may likewise have two primary parts 3 as shown in FIG. 22, which are arranged around a centrally arranged secondary part 6 in the form of a double-comb. The mounting structure 200 together with the primary parts 3 arranged on the limbs carries out a linear movement 211.

The advantage of these two arrangements with a symmetrical design is load reduction on the linear guides owing to the magnetic attraction forces being cancelled out, in particular the lateral forces. The load on the mechanical guide elements is reduced.

A two-track or multiple-track motor arrangement, for example for board splitting saws, can likewise be provided, in which a primary part mount is arranged such that it can move, with the primary parts each being located above the secondary parts, and thus being able to carry out a linear movement. The tools may be located on the primary part mount.

Tools for use with woodworking machines include, inter alia, mills, grinding machines, edge formers, drills, saws and profiling machines. Workpieces include, inter alia, wooden boards or particle boards, untreated wooden trunks, beams, strips. These workpieces are transported, inter alia, by tongs, suction cups or other appliances that are known per se. Both the tools and the workpieces can be positioned, transported and machined by means of the linear direct drive.

Figure 23:
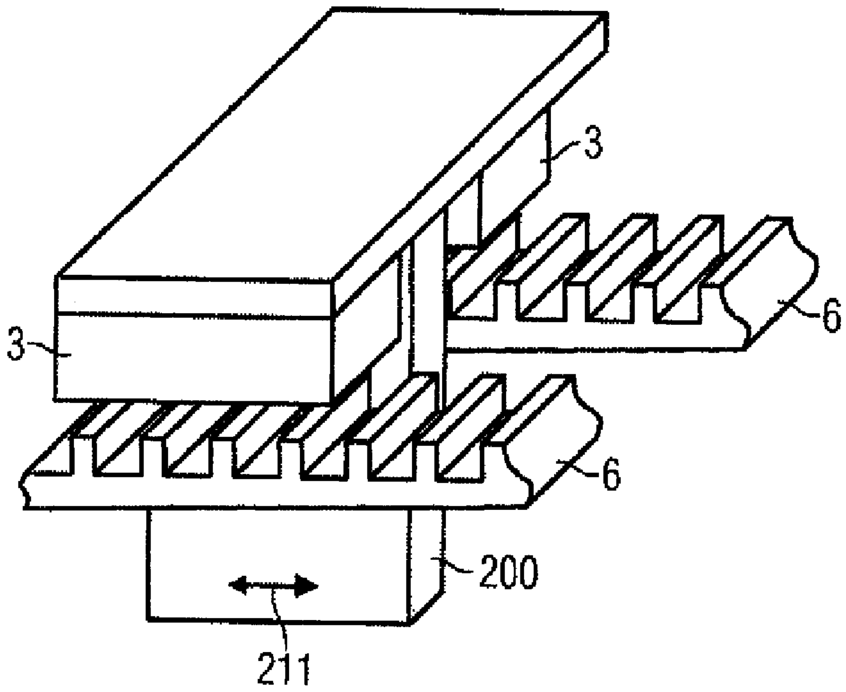

FIG. 23 shows an arrangement in which primary parts 3 are arranged on a T-shaped mounting structure 200. Multiple-track arrangements can also be produced as a modification to this principle. At least one linear direct drive moves a mounting structure forward, on which a plurality of tools are arranged. A direct drive must be provided for each track, in order to allow autonomous machining.

Figure 24:
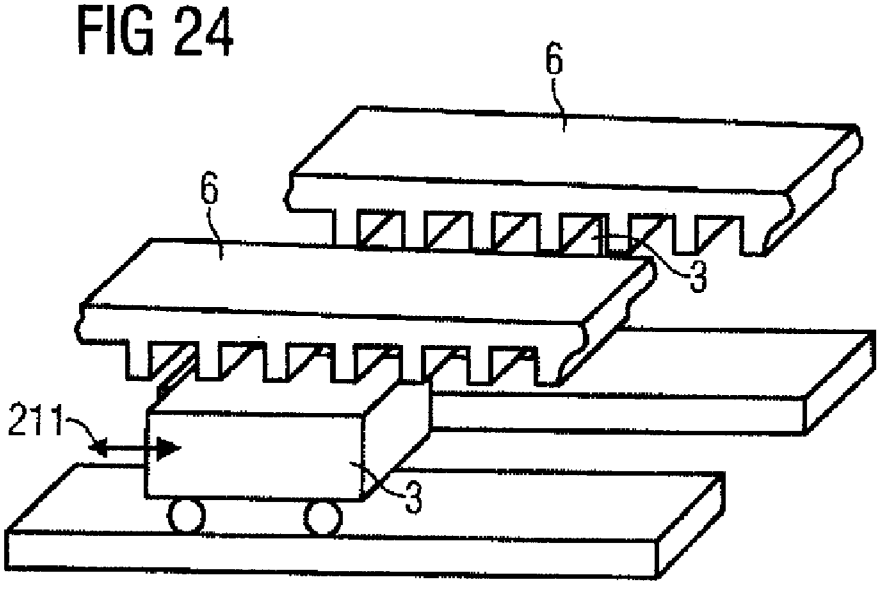

FIG. 24 shows an outline illustration of a two-track arrangement, with the primary part and secondary part each forming a linear motor, and with the primary parts not being mechanically connected. Each of the primary parts carries out an autonomous movement. However, the two primary parts may be electrically coupled.

Arrangements such as these or else suitable modifications of them, matched to the respective requirements, form the basis of the woodworking machines which will now be described in the following text. The movements carried out by each of the linear direct drives are represented by action arrows 311. Workpiece transport from and to the woodworking machine and workpiece transport within the woodworking machine may, of course, be carried out by the linear direct drives, because of their simplicity. The primary parts are mainly fitted with the tools of the woodworking machines.

Figure 29:
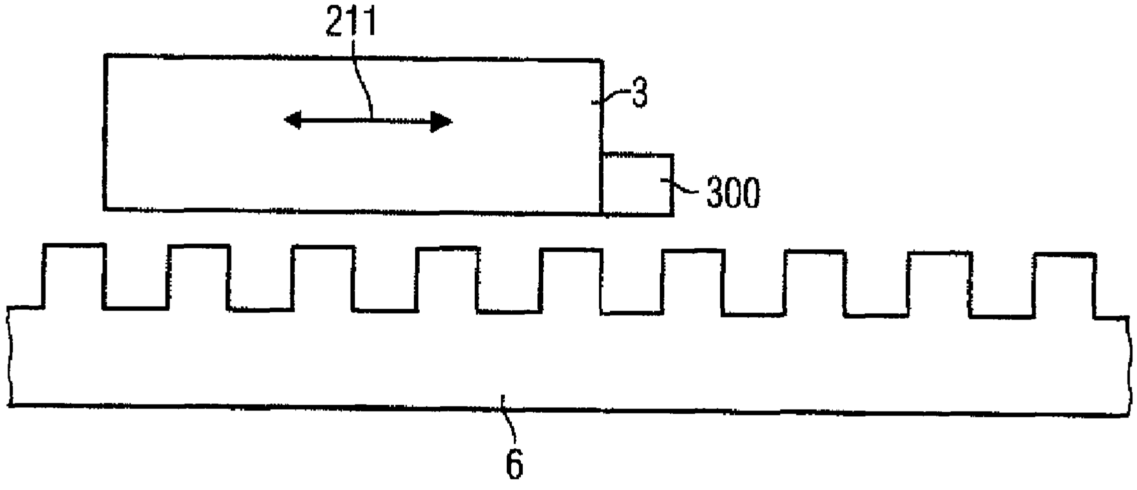
FIG. 29 shows an outline illustration of a position sensor on the primary part.

It is particularly advantageous for the primary part to have a sensor 300 as shown in FIG. 29. This allows speed and position actual values to be detected in a simple manner, together with the secondary part, accurately and irrespective of the environmental conditions. The secondary parts can be manufactured with high precision, so that direct recording is possible.

Inter alia, this improves the availability of the woodworking machine by reducing the fault-dependent failures. This results in easy integration of the measurement system. There is no need for complex encapsulation of the bandsaw, because of the robust form of the, in particular, toothed secondary part. This also results in simple setting up, since there is no need for adjustment between the dimensional embodiment and the secondary part.

Figure 25:
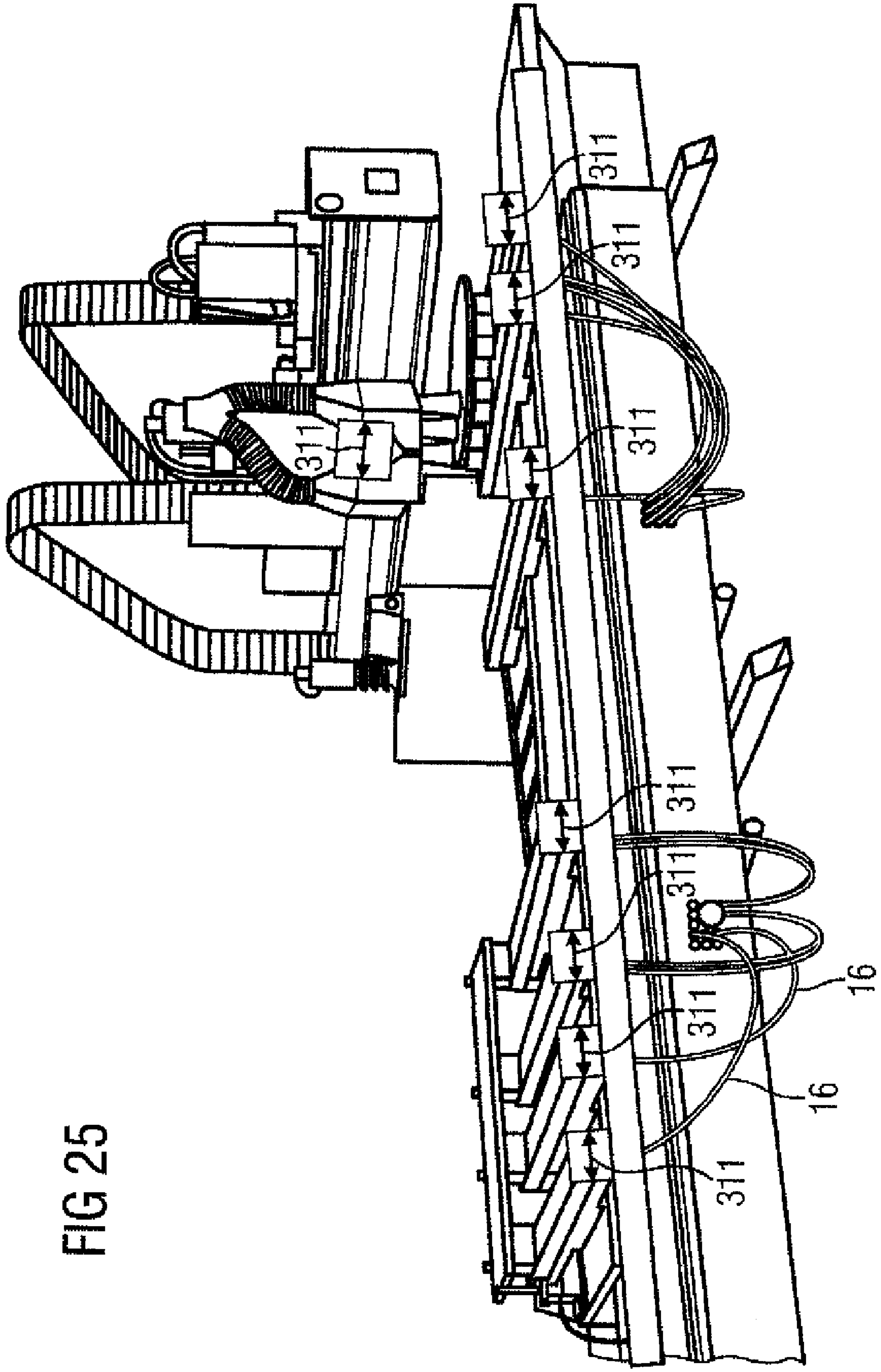
FIG. 25 shows an outline illustration for an upper mill.

Linear direct drives are particularly suitable for machining centers, for example an upper mill as illustrated in principle in FIG. 25, since the tool carrier is in the form of a cruciform carriage, with guidance being provided by a secondary part and with the tool carrier being provided by a primary part. A machining center such as this can also be produced, if required, in which the guide is the primary part and the tool carrier is the secondary part. This is particularly advantageous since this makes it possible to save pulling cables 16, so that the overall woodworking machine can be produced more cost-effectively.

Figure 26:
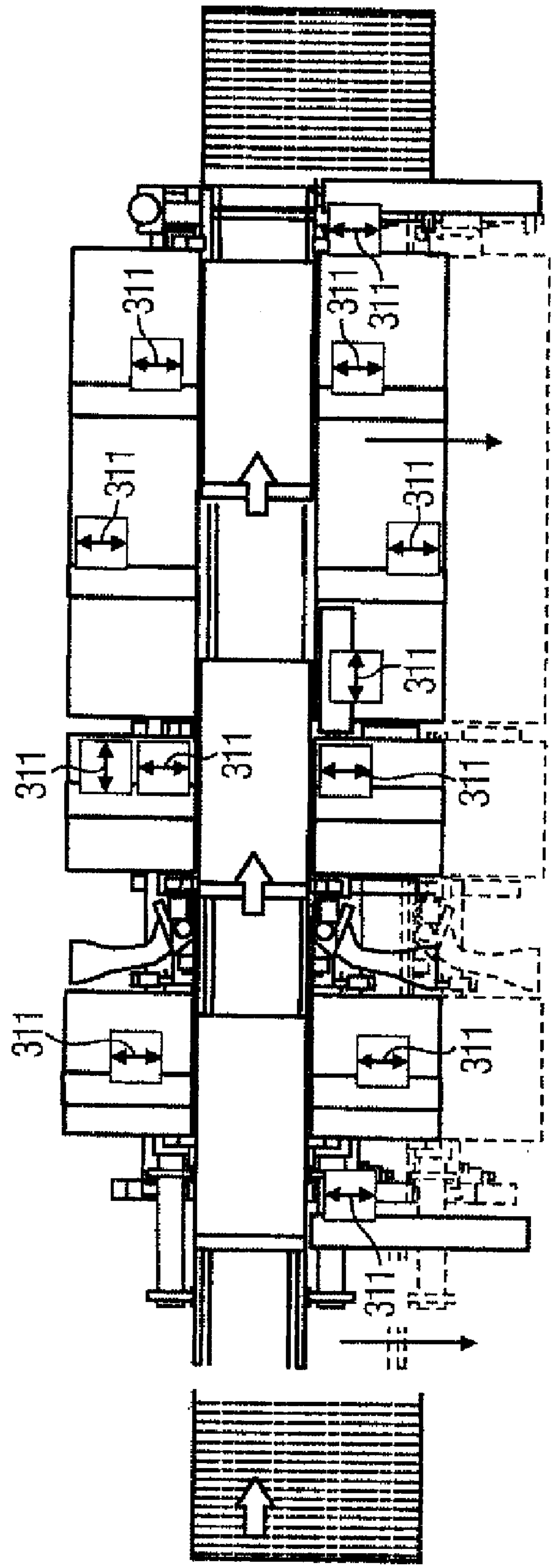
FIG. 26 shows an outline illustration for an edge-machining machine.

In the same way, in the case of edge processing machines as shown in FIG. 26, it is possible to adjust the width of the woodworking machine to match the workpiece size, for example a particle board, by means of one or more linear direct drives. Guidance is provided by a secondary part, with the machine mount being attached to the primary part. Depending on the physical embodiments of the machine, the machine mount may also form the secondary part, with guidance being provided by the primary part. In the case of machine mounts which have the primary part, it is possible to achieve gantry synchronization between a plurality of axes over long machine lengths.

Figure 27:
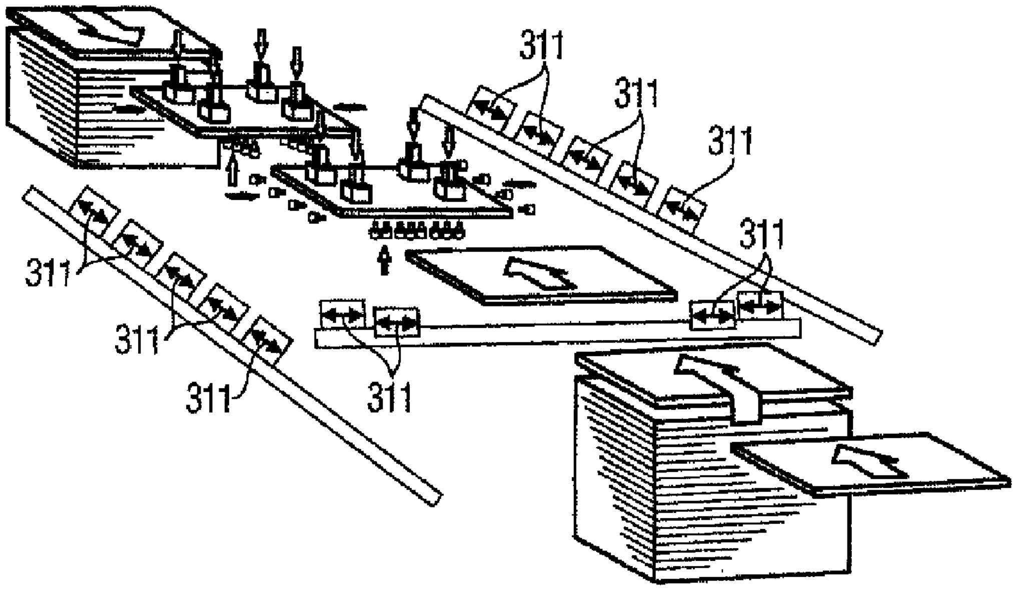
FIG. 27 shows an outline illustration of a dowel drilling machine.

In the case of dowel drilling machines as shown in FIG. 27 as well, both the positioning of the drill supports in the longitudinal direction and the lateral positioning of the drill heads for vertical holes and horizontal holes are arranged on one or more primary parts. The guidance is in each case provided by the secondary part. In this case, a common or single secondary part may be provided.

Figure 28:
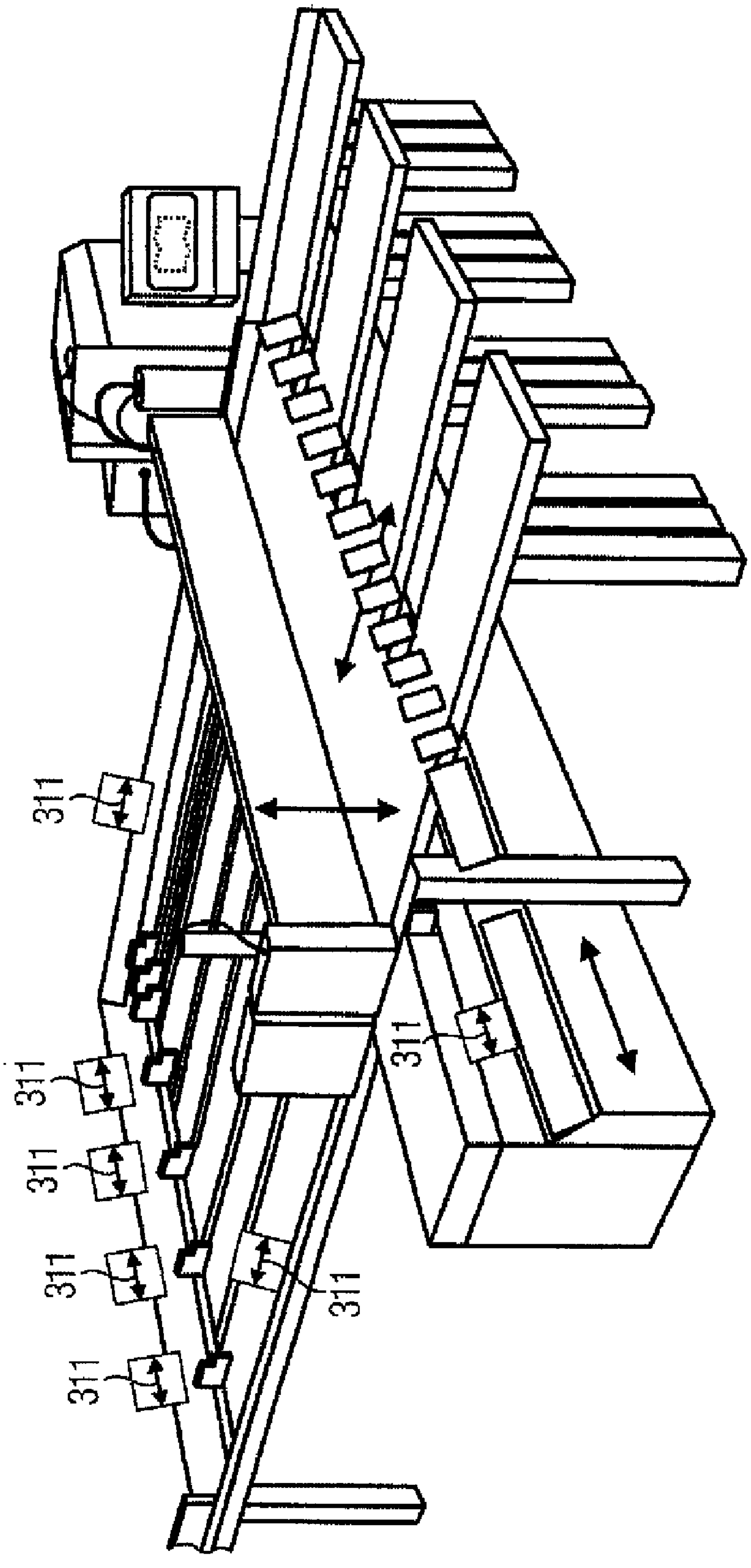
FIG. 28 shows an outline illustration of a board splitting saw.

In the case of board splitting saws as shown in FIG. 28, the secondary part advantageously carries out the guidance, while the function of a clamping tong mount and that of the workpiece carrier is carried out by the primary part. Cut guidance and reverse transport of the sawing carriage are likewise carried out by the secondary part, whilst the sawing carriage is positioned on the primary part.

Linear direct drives can also be used for further woodworking machines, such as splitting and bridge saws, profiling machines, edge gluing machines and edge processing machines. One or more specific woodworking machines can also be combined in machining centers. A plurality of linear direct drives can be used in this case, which machine the workpieces successively and/or at the same time on one and/or more planes.

What is claimed is:

1. A woodworking machine, comprising:

at least one linear direct drive having a primary part including a first means for producing a first magnetic field and a second means for producing a second magnetic field; and a secondary part constructed to provide a magnetic return path and constructed to be free of magnetic sources, wherein at least one member selected from the group consisting of the primary part and the secondary part is constructed for guiding or setting at least one member selected from the group consisting of a workpiece, and a tool for machining the workpiece in the woodworking machine, wherein the secondary part has a tooth pitch which is not an integer multiple of a magnet pitch of the primary part, with the tooth pitch of the secondary part being greater than the tooth pitch of the primary part, and wherein the primary part has a tooth and a magnet, said magnet being vertically positioned substantially in mid-section of the tooth.

2. The woodworking machine of claim 1, wherein the first means is arranged with respect to the second means in such a way as to superimpose the second magnetic field on the first magnetic field.

3. The woodworking machine of claim 1, wherein the primary part is encapsulated.

4. The woodworking machine of claim 1, wherein the secondary part has a laminated configuration.

5. The woodworking machine of claim 1, wherein the secondary part has a solid configuration.

6. The woodworking machine of claim 1, wherein an air gap is formed between the primary part and the secondary part, with the air gap having at least two different widths.

7. The woodworking machine of claim 1, wherein the primary part is arranged between two of said secondary part to thereby form a common magnetic circuit which affects the two secondary parts and the primary part.

8. The woodworking machine of claim 1, wherein the first means includes a winding to define a phase, said winding including two tooth coils to define the phase.

9. A woodworking machine, comprising:

a plurality of linear direct drives for allowing a machining of workpieces in one or more levels, each said linear direct drive having a primary part including a first means for producing a first magnetic field and a second means for producing a second magnetic field; and a secondary part constructed to provide a magnetic return path and constructed to be free of magnetic sources, wherein at least one member selected from the group consisting of the primary part and the secondary part is constructed for guiding or setting at least one member selected from the group consisting of a workpiece, and a tool for machining the workpiece, and wherein the secondary part has a tooth pitch which is not an integer multiple of a magnet pitch of the primary part, with tooth pitch of the secondary part being greater than the tooth pitch of the primary part, and wherein the primary part has a tooth and a magnet, said magnet being vertically positioned substantially in mid-section of the tooth.

10. The woodworking machine of claim 9, wherein the linear direct drives operate autonomously.

11. The woodworking machine of claim 9, wherein the linear direct drives are coupled mechanically or electrically.

12. The woodworking machine of claim 9, wherein the first means is arranged with respect to the second means in such a way as to superimpose the second magnetic field on the first magnetic field.

13. The woodworking machine of claim 9, wherein the primary part is encapsulated.

14. The woodworking machine of claim 9, wherein the secondary part has a laminated configuration.

15. The woodworking machine of claim 9, wherein the secondary part has a solid configuration.

16. The woodworking machine of claim 9, wherein an air gap is formed between the primary part and the secondary part, with the air gap having at least two different widths.

17. The woodworking machine of claim 9, wherein the primary part is arranged between two of said secondary part to thereby form a common magnetic circuit which affects the two secondary parts and the primary part.

18. The woodworking machine of claim 9, wherein the first means includes a winding to define a phase, said winding including two tooth coils to define the phase.

* * * * *